US012803486B2

(12) United States Patent
Funakoshi et al.

(10) Patent No.: US 12,803,486 B2
(45) Date of Patent: Nov. 17, 2026

(54) MOTOR CONTROL DEVICE AND ELECTRIC POWER STEERING DEVICE

(71) Applicant: Mitsubishi Electric Corporation, Tokyo (JP)

(72) Inventors: Masayuki Funakoshi, Tokyo (JP); Takahiro Kunimitsu, Tokyo (JP); Kenji Ogawa, Tokyo (JP); Hiroyuki Kozuki, Tokyo (JP); Takashi Yagihara, Tokyo (JP); Takuya Kimura, Tokyo (JP); Kento Ogiwara, Tokyo (JP); Masaki Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 18/711,738

(22) PCT Filed: Dec. 21, 2021

(86) PCT No.: PCT/JP2021/047287

§ 371 (c)(1),
(2) Date: May 20, 2024

(87) PCT Pub. No.: WO2023/119410

PCT Pub. Date: Jun. 29, 2023

(65) Prior Publication Data

US 2025/0038693 A1 Jan. 30, 2025

(51) Int. Cl.

| | |
|---|---|
| ***H02P 29/028*** | (2016.01) |
| ***B62D 5/04*** | (2006.01) |
| ***H02P 25/22*** | (2006.01) |

(52) U.S. Cl.

CPC ............ *H02P 29/028* (2013.01); *B62D 5/046* (2013.01); *H02P 25/22* (2013.01)

(58) Field of Classification Search

CPC .... H02H 7/0844; H02H 7/1225; H02H 7/122; H02H 7/085; H02H 7/0805;
(Continued)

(56) References Cited

U.S. PATENT DOCUMENTS

| | | | |
|---|---|---|---|
| 5,927,430 | A | 7/1999 | Mukai et al. |
| 2014/0229074 | A1 | 8/2014 | Kanekawa et al. |

(Continued)

FOREIGN PATENT DOCUMENTS

| | | | |
|---|---|---|---|
| GB | 2 204 006 | A | 11/1988 |
| JP | 2008-220155 | A | 9/2008 |

(Continued)

OTHER PUBLICATIONS

Extended European Search report dated Dec. 20, 2024 in Application No. 21968847.0.
International Search Report for PCT/JP2021/047287, dated Mar. 8, 2022.

*Primary Examiner* — Antony M Paul
(74) *Attorney, Agent, or Firm* — Sughrue Mion, PLLC

(57) ABSTRACT

A motor control device according to the present disclosure includes: a motor drive circuit that outputs a drive current to a motor; a drive current detector; a main control unit, and an auxiliary control unit, wherein the main control unit has a first control signal generator that generates a first control signal based on a detected current signal; a first drive signal generator that generates a drive signal based on the first control signal, and a first switcher that switches to an output state of the motor drive circuit of the drive signal, and the auxiliary control unit has a second control signal generator that generates a second control signal; a second drive signal generator that generates the drive signal based on the second control signal, and a second switcher that switches to an output state of the motor drive circuit of the drive signal.

9 Claims, 6 Drawing Sheets

(58) Field of Classification Search
CPC ...... H02H 7/0822; H01H 89/00; H01H 50/54; H02M 1/32; H02M 1/36; H02M 7/53871; H02M 1/0009; H02M 7/493; H02M 1/084; H02P 29/024; H02P 29/028; H02P 25/22; H02P 27/06; H02P 2207/05; H02P 29/0241; H02P 29/025; H02P 29/027; H02P 29/032; H02P 6/12; H02P 21/22; H02P 29/02; H02P 6/085; H02P 6/14; H02P 3/18; H02P 2101/45; H02P 27/08; H02P 21/20; H02P 6/08; H02P 6/28; H02P 2201/01; H02P 2201/09; H02P 2205/05; H02P 2205/01; H02P 2209/05; H02P 3/12; H02P 3/22; H02P 3/00; H02P 6/24; B60L 3/04; B60L 3/0023; B60L 2240/527; B60L 2240/529; B60L 3/003; B60L 3/0038; B60L 3/0092; B60L 53/20; B60L 2210/40; B60L 3/0061; B62D 5/046; B62D 5/0481; B62D 5/0487; B62D 5/0493; B62D 5/049; B62D 5/003; B62D 5/001; B62D 6/00; B62D 5/0484; B62D 5/0463; B62D 5/04; B62D 5/0409; B62D 5/30; G05B 19/048
See application file for complete search history.

(56) References Cited

U.S. PATENT DOCUMENTS

| | | | |
|---|---|---|---|
| 2019/0039644 | A1 | 2/2019 | Bernon-Enjalbert et al. |
| 2019/0097565 | A1 * | 3/2019 | Hayakawa .............. H02P 6/085 |
| 2021/0086827 | A1 | 3/2021 | Kuehnhoefer et al. |
| 2021/0226574 | A1 | 7/2021 | Kimura et al. |

FOREIGN PATENT DOCUMENTS

| | | | |
|---|---|---|---|
| JP | 2016-001953 | A | 1/2016 |
| JP | 2019-161994 | A | 9/2019 |
| JP | 6701847 | B2 | 5/2020 |
| JP | 2021-035075 | A | 3/2021 |
| JP | 2021-508635 | A | 3/2021 |

* cited by examiner

MOTOR CONTROL DEVICE AND ELECTRIC POWER STEERING DEVICE

CROSS REFERENCE TO RELATED APPLICATIONS

This application is a National Stage of International Application No. PCT/JP2021/047287 filed Dec. 21, 2021.

TECHNICAL FIELD

The present disclosure relates to a motor control device and an electric power steering device.

BACKGROUND ART

An electric power steering device which includes a motor control device that has a main control unit and an auxiliary control unit is disclosed in Patent Document 1. As such, by adopting a double redundant control system, it is possible to continue motor control even when an abnormality occurs in one control unit of the control system.

CITATION LIST

Patent Document

[Patent Document 1] Published Japanese Translation No. 2021-508635 of the PCT International Publication

SUMMARY OF INVENTION

Problem to be Solved by the Invention

Since the main control unit and the auxiliary control unit share a pre-driver in the motor control device disclosed in Patent Document 1, when an abnormality occurs in the pre-driver, there is a possibility that the motor is not being adequately controlled.

The present disclosure has been made in order to address the problem above, and an object is to provide a motor control device and an electric power steering device by that are more stable against abnormality occurrences.

Means to Solve the Problem

A motor control device according to an embodiment of the present disclosure includes: a motor drive circuit that outputs a drive current to a motor; a drive current detector that detects the drive current; a main control unit, and an auxiliary control unit, wherein the motor drive circuit is driven based on a drive signal that is output from the main control unit or the auxiliary control unit, the main control unit has a first control signal generator that generates a first control signal based on a detected current signal that is input from the drive current detector; a first drive signal generator that generates the drive signal based on the first control signal, and a first switcher that switches an output state of the drive signal to the motor drive circuit, and the auxiliary control unit has a second control signal generator that generates a second control signal based on a detected current signal that is input from the drive current detector; a second drive signal generator that generates the drive signal based on the second control signal, and a second switcher that switches an output state of the drive signal to the motor drive circuit.

An electric power steering device according to an embodiment of the present disclosure includes the aforementioned motor control device, and the motor which generates an assist torque to assist a steering torque of steering of an operator.

Effects of the Invention

According to the present disclosure, it is possible to provide a motor control device and an electric power steering device that are more stable against abnormality occurrences.

DESCRIPTION OF EMBODIMENTS

Hereinafter, configurations of the present disclosure are explained with reference to the drawings. The scope of the present disclosure is not limited to the embodiments below, and may be changed so long as the embodiments do not depart from the technical scope of the present disclosure.

First Embodiment

Figure 1:
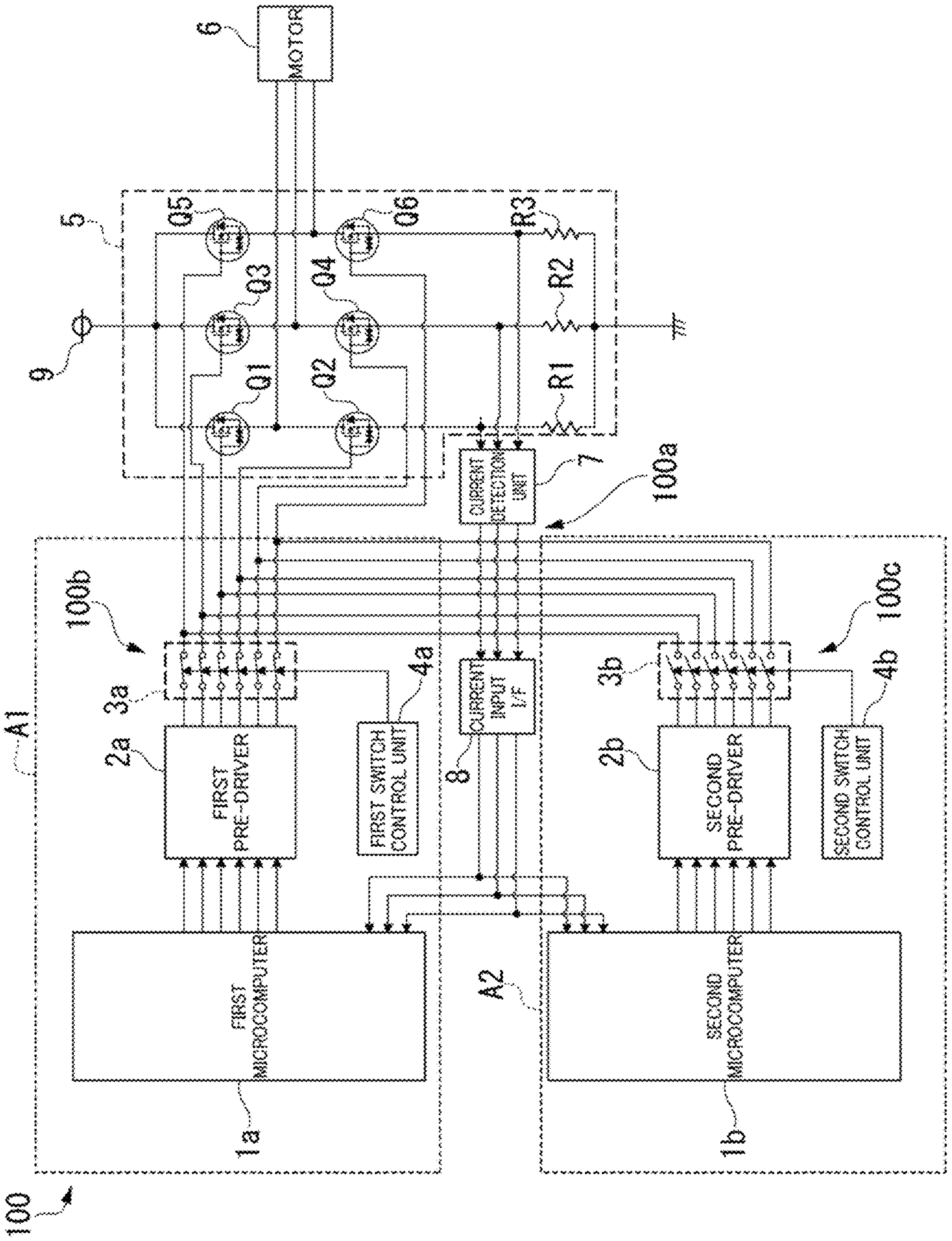
FIG. 1 A block diagram showing an overall configuration of a motor control device according to a first embodiment.

As shown in FIG. 1, a motor control device 100 according to a first embodiment includes a main control unit A1, an auxiliary control unit A2, a motor drive circuit 5, a current detection unit 7, and a current input I/F 8. In the present description, "IF" stands for "interface".

The motor control device 100 is configured as a double redundant control system that includes a first control system (main control unit A1) and a second control system (auxiliary control unit A2). The motor control device 100 is an example of a part of an electric power steering device mounted on an automobile. The motor control device 100 controls the motor 6 that is included by the electric power steering device. The motor 6 is connected to a steering system not shown on the drawings.

As shown in FIG. 1, the main control unit A1 includes a first microcomputer 1*a*, a first pre-driver 2*a*, a first signal cut off switch 3*a* and a first switch control unit 4*a*. The auxiliary control unit A2 includes a second microcomputer 1*b*, a second pre-driver 2*b*, a second signal cut off switch 3*b* and a second switch control unit 4*b*. The first microcomputer 1*a* corresponds to a first control signal generator, and the second microcomputer 1*b* corresponds to a second control signal generator. The first pre-driver 2*a* corresponds to a first drive signal generator, and the second pre-driver 2*b* corresponds to a second drive signal generator.

The motor drive circuit 5 includes six switching transistors Q1 to Q6, and three shunt resistors R1 to R3. Switching transistors Q1 to Q6 are types of switching elements. A switching element other than a switching transistor may be used. The motor drive circuit 5 is configured to drive the motor 6 by having the plurality of switching transistors Q1 to Q6 switch between supply and cut off of a drive current to the motor 6.

The motor 6 includes three input terminals (U phase input terminal, V phase input terminal, and a W phase input terminal). The motor drive circuit 5 inputs three phase drive currents (U phase drive current, V phase drive current, and W phase drive current) into each of the input terminals of the motor 6. As such, the motor 6 is driven. In other words, the motor 6 in the present embodiment is a three phase direct current electric motor.

The motor 6 is a generating source of an assist torque to assist steering of an operator operating an automobile. In other words, the motor 6 conducts assistance so as to allow for steering using a smaller steering torque when the operator is steering the automobile.

The first microcomputer 1*a* generates six gate control signals based on a control program that is stored in advance. The first microcomputer 1*a* is an integrally formed chip, having a memory unit which stores the control program, a calculation unit that executes calculations, and the like based on the control program. The first microcomputer 1*a* includes at least six output terminals, and at least three input terminals. It is possible to change a number of input terminals and the number of output terminals in the various components as necessary. Output terminals or input terminals that are not connected to any components may exist.

The six output terminals that are included in the first microcomputer 1*a* are connected to the first pre-driver 2*a*. The first microcomputer 1*a* outputs the six gate control signals to the first pre-driver 2*a* via the six output terminals. The three input terminals that are included in the first microcomputer 1*a* are connected to the current input I/F 8. Current detection signals that correspond to three phases (U phase, V phase, and W phase) are input to the first microcomputer 1*a* from the current input I/F 8 via the three input terminals.

The six gate control signals mentioned above correspond to the six switching transistors Q1 to Q6 in the motor drive circuit 5. Hereinafter, a control signal corresponding to the switching transistor Q1 is referred to as "gate control signal S1", a control signal corresponding to the switching transistor Q2 is referred to as "gate control signal S2", a control signal corresponding to the switching transistor Q3 is referred to as "gate control signal S3", a control signal corresponding to the switching transistor Q4 is referred to as "gate control signal S4", a control signal corresponding to the switching transistor Q5 is referred to as "gate control signal S5", and a control signal corresponding to the switching transistor Q6 is referred to as "gate control signal S6".

The first pre-driver 2*a* is a gate driver that generates six gate signals Sg1 to Sg6 based on the six gate control signals S1 to S6. The first pre-driver 2*a* may be a single IC (Integrated Circuit). Voltages of the gate control signals S1 to S6 that the first microcomputer 1*a* generates are not enough to operate the switching transistors Q1 to Q6. As such, the first pre-driver 2*a* generates the gate signals Sg1 to Sg6 that have enough voltages to operate the switching transistors Q1 to Q6, based on the gate control signals S1 to S6. Each of the gate signals Sg1 to Sg6 corresponds to each of the gate control signals S1 to S6.

As shown in FIG. 1, the first pre-driver 2*a* includes six input terminals and six output terminals. Each of the six input terminals is connected to each of the six output terminals in the first microcomputer 1*a*, and each of the gate control signals S1 to S6 is received therefrom. Each of the six output terminals is connected to the first signal cut off switch 3*a*, and a corresponding gate signal Sg1 to Sg6 is output to the first signal cut off switch 3*a*.

The first signal cut off switch 3*a* includes six on/off switches that correspond to each of the gate signals Sg1 to Sg6. The first signal cut off switch 3*a* includes six input terminals and six output terminals that correspond to each on/off switch. The first signal cut off switch 3*a* also includes one control input terminal. Each of the six input terminals in the first signal cut off switch 3*a* is connected to each of the output terminals in the first pre-driver 2*a*, and is input into each of the gate signals Sg1 to Sg6.

The six output terminals in the first signal cut off switch 3*a* are connected to the motor drive circuit 5. The first signal cut off switch 3*a* outputs the six gate signals Sg1 to Sg6 to the motor drive circuit 5 via the six output terminals. The one control input terminal in the first signal cut off switch 3*a* is connected to the first switch control unit 4*a*. The first switch control unit 4*a* inputs a first switching signal to the first signal cut off switch 3*a* via the one control input terminal mentioned above.

The first signal cut off switch 3*a* switches between the on/off states of the six on/off switches, based on the first switching signal. As such, the first signal cut off switch 3*a* is a changeover switch that switches an output state (output/no output) of the gate signals Sg1 to Sg6 from the main control unit A1 to the motor drive circuit 5, based on the first switching signal.

The first switch control unit 4*a* is a signal generating circuit that generates the first switching signal of the first signal cut off switch 3*a*, and includes one output terminal. The first switch control unit 4*a* outputs the first switching signal to the control input terminal of the first signal cut off switch 3*a*.

The second microcomputer 1*b* generates the six gate control signals S1 to S6 to control the motor 6 based on the control program that is stored in advance. The second microcomputer 1*b* is an integrally formed chip, having a memory unit which stores the control program, a calculation unit that executes calculations, and the like based on the control program. The control program of the second microcomputer 1*b* is the same as the control program of the first microcomputer 1*a*. The second microcomputer 1*b* includes at least six output terminals, and at least three input terminals.

The six output terminals that are included in the second microcomputer 1*b* are connected to the second pre-driver 2*b*. The second microcomputer 1*b* outputs the six gate control signals S1 to S6 to the second pre-driver 2*b* via the six output terminals. The three input terminals that are included in the second microcomputer 1*b* are connected to the current input I/F 8. The current detection signals that correspond to three phases (U phase, V phase, and W phase) are input to the second microcomputer 1*b* from the current input I/F 8 via the three input terminals.

The second pre-driver 2*b* is a gate driver that generates the six gate signals Sg1 to Sg6 based on the six gate control signals S1 to S6. The second pre-driver 2*a* may be a single IC (Integrated Circuit). Voltages of the gate control signals S1 to S6 that the second microcomputer 1*b* generates are not enough to operate the switching transistors Q1 to Q6. As such, the second pre-driver 2*b* generates the gate signals Sg1 to Sg6 that have enough voltages to operate the switching transistors Q1 to Q6, based on the gate control signals S1 to S6.

The second pre-driver 2*b* includes six input terminals and six output terminals. Each of the six input terminals is connected to each of the six output terminals in the second microcomputer 1*b*, and each of the gate control signals S1 to S6 is received therefrom. Each of the six output terminals is connected to the second signal cut off switch 3*b*, and a corresponding gate signal Sg1 to Sg6 is output to the second signal cut off switch 3*b*.

The second signal cut off switch 3*b* includes six on/off switches that correspond to each of the gate signals Sg1 to Sg6. The second signal cut off switch 3*b* includes six input terminals and six output terminals that correspond to each on/off switch. The second signal cut off switch 3*b* also includes one control input terminal. Each of the six input terminals in the second signal cut off switch 3*b* is connected to each of the output terminals in the second pre-driver 2*b*, and is input into each of the gate signals Sg1 to Sg6.

The six output terminals in the second signal cut off switch 3*b* are connected to the motor drive circuit 5. The second signal cut off switch 3*b* outputs the six gate signals Sg1 to Sg6 to the motor drive circuit 5 via the six output terminals. The one control input terminal in the second signal cut off switch 3*b* is connected to the second switch control unit 4*b*. The second switch control unit 4*b* inputs a second switching signal to the second signal cut off switch 3*b* via the one control input terminal mentioned above.

The second signal cut off switch 3*b* switches between the on/off states of the six on/off switches, based on the second switching signal. As such, the second signal cut off switch 3*b* is a changeover switch that switches an output state (output/no output) of the gate signals Sg1 to Sg6 from the auxiliary control unit A2 to the motor drive circuit 5, based on the second switching signal.

The second switch control unit 4*b* is a signal generating circuit that generates the second switching signal of the second signal cut off switch 3*b*, and includes one output terminal. The second switch control unit 4*b* outputs the second switching signal to the control input terminal of the second signal cut off switch 3*b*.

Each of the six output terminals in the second signal cut off switch 3*b* are connected to each of the corresponding output terminals in the first signal cut off switch 3*a*. In other words, the main control unit A1 and the auxiliary control unit A2 are connected to the motor drive circuit 5 so that the gate signals Sg1 to Sg6 are input to the motor drive circuit 5 from either of the main control unit A1 or the auxiliary control unit A2.

When the main control unit A1 is operating, the six gate signals Sg1 to Sg6 from the first signal cut off switch 3*a* are input to the motor drive circuit 5. When the auxiliary control unit A2 is operating, the six gate signals Sg1 to Sg6 from the second signal cut off switch 3*b* are input to the motor drive circuit 5.

The motor drive circuit 5 is a three phase inverter that includes three switching legs, each corresponding to a U phase, a V phase, and a W phase. Hereinafter, a switching leg corresponding to the U phase is referred to as a "U phase leg", a switching leg corresponding to the V phase is referred to as a "V phase leg", and a switching leg corresponding to the W phase is referred to as a "W phase leg". The motor drive circuit 5 is controlled based on the six gate signals Sg1 to Sg6 that are input from either of the main control A1 or from the auxiliary control A2. The motor drive circuit 5 converts a direct current of a predetermined voltage (typically 12V) supplied from a battery 9 of the automobile to three phases, U phase, V phase, and W phase of an alternating current power, and outputs the aforementioned to the motor 6.

The U phase leg includes the switching transistor Q1 that configures an upper arm, the switching transistor Q2 that configures a lower arm, and the shunt resistor R1.

The switching transistor Q1 is an MOS transistor, and includes a gate terminal, a source terminal and a drain terminal. The gate terminal of the switching transistor Q1 is connected to the output terminal of the first signal cut off switch 3*a* and the output terminal of the second signal cut off switch 3*b*. The gate terminal of the switching transistor Q1 is input to either of the first signal cut off switch 3*a* or the second signal cut off switch 3*b* from the gate signal Sg1.

The source terminal of the switching transistor Q1 is connected to the drain terminal of the switching transistor Q2 and the U phase input terminal of the motor 6. The drain terminal of the switching transistor Q1 is connected to an external battery 9.

The switching transistor Q2 is an MOS transistor, and includes a gate terminal, a source terminal and a drain terminal. The gate terminal of the switching transistor Q2 is connected to the output terminal of the first signal cut off switch 3*a* and the output terminal of the second signal cut off switch 3*b*. The gate terminal of the switching transistor Q2 is input to either of the first signal cut off switch 3*a* or the second signal cut off switch 3*b* from the gate signal Sg2.

The source terminal of the switching transistor Q2 is connected to an end of the shunt resistor R1 and to the current detection unit 7. The drain terminal of the switching transistor Q2 is connected to the source terminal of the switching transistor Q1 and to the U phase input terminal of the motor 6.

The shunt resistor R1 is connected in series to the switching transistor Q1 of the upper arm and the switching transistor Q2 of the lower arm. An end of the shunt resistor R1 is connected to the source terminal of the switching transistor Q2 and the current detection unit 7, and another end is connected to the ground (reference potential). A drop in voltage corresponding to the U phase drive current is generated at the shunt resistor R1. The current detection unit 7 obtains a U phase detected voltage corresponding to the U phase drive current, based on the voltage drop at the shunt resistor R1.

The V phase leg includes the switching transistor Q3 that configures an upper arm, the switching transistor Q4 that configures a lower arm, and the shunt resistor R2.

The switching transistor Q3 is an MOS transistor, and includes a gate terminal, a source terminal and a drain terminal. The gate terminal of the switching transistor Q3 is connected to the output terminal of the first signal cut off switch 3*a* and the output terminal of the second signal cut off switch 3*b*. The gate terminal of the switching transistor Q3 is input to either of the first signal cut off switch 3*a* or the second signal cut off switch 3*b* from the gate signal Sg3.

The source terminal of the switching transistor Q3 is connected to the drain terminal of the switching transistor Q4 and the U phase input terminal of the motor 6. The drain terminal of the switching transistor Q3 is connected to the external battery 9.

The switching transistor Q4 is an MOS transistor, and includes a gate terminal, a source terminal and a drain terminal. The gate terminal of the switching transistor Q4 is connected to the output terminal of the first signal cut off switch 3*a* and the output terminal of the second signal cut off switch 3*b*. The gate terminal of the switching transistor Q4 is input to either of the first signal cut off switch 3*a* or the second signal cut off switch 3*b* from the gate signal Sg4.

The source terminal of the switching transistor Q4 is connected to an end of the shunt resistor R2 and to the current detection unit 7. The drain terminal of the switching transistor Q4 is connected to the source terminal of the switching transistor Q3 and to the V phase input terminal of the motor 6.

The shunt resistor R2 is connected in series to the switching transistor Q3 of the upper arm and the switching transistor Q4 of the lower arm. An end of the shunt resistor R2 is connected to the source terminal of the switching transistor Q4 and the current detection unit 7, and another end is connected to the ground (reference potential). A drop in voltage corresponding to the V phase drive current is generated at the shunt resistor R2. The current detection unit 7 obtains a V phase detected voltage corresponding to the V phase drive current, based on the voltage drop at the shunt resistor R2.

The W phase leg includes the switching transistor Q5 that configures an upper arm, the switching transistor Q6 that configures a lower arm, and the shunt resistor R3.

The switching transistor Q5 is an MOS transistor, and includes a gate terminal, a source terminal and a drain terminal. The gate terminal of the switching transistor Q5 is connected to the output terminal of the first signal cut off switch 3*a* and the output terminal of the second signal cut off switch 3*b*. The gate signal Sg5 is input to the gate terminal of the switching transistor Q5 from the first signal cut off switch 3*a* or the second signal cut off switch 3*b*.

The source terminal of the switching transistor Q5 is connected to the drain terminal of the switching transistor Q6 and the W phase input terminal of the motor 6. The drain terminal of the switching transistor Q5 is connected to the external battery 9.

The switching transistor Q6 is an MOS transistor, and includes a gate terminal, a source terminal and a drain terminal. The gate terminal of the switching transistor Q6 is connected to the output terminal of the first signal cut off switch 3*a* and the output terminal of the second signal cut off switch 3*b*. The gate signal Sg6 is input to the gate terminal of the switching transistor Q6 from the first signal cut off switch 3*a* or the second signal cut off switch 3*b*.

The source terminal of the switching transistor Q6 is connected to an end of the shunt resistor R3 and to the current detection unit 7. The drain terminal of the switching transistor Q6 is connected to the source terminal of the switching transistor Q5 and to the W phase input terminal of the motor 6.

The shunt resistor R3 is connected in series to the switching transistor Q5 of the upper arm and the switching transistor Q6 of the lower arm. An end of the shunt resistor R3 is connected to the source terminal of the switching transistor Q6 and the current detection unit 7, and another end is connected to the ground (reference potential). A drop in voltage corresponding to the W phase drive current is generated at the shunt resistor R3. The current detection unit 7 obtains a W phase detected voltage corresponding to the W phase drive current, based on the voltage drop at the shunt resistor R3.

The current detection unit 7 detects the U phase drive current, the V phase drive current, and the W phase drive current based on a U phase detection voltage, a V phase detection voltage, and a W phase detection voltage. Drive currents of various phases detected by the current detection unit 7 in the present description are collectively referred to as "detected currents". The current detection unit 7 includes three input terminals and three output terminals. Each of the three input terminals of the current detection unit 7 are connected to ends of the shunt resistors R1 to R3, and each of the U phase detected voltage, the V phase detected voltage, and the W phase detected voltage is input thereto. Each of the three output terminals in the current detection unit 7 are connected to the current input I/F 8.

The current input I/F 8 is provided between the current detection unit 7 and the microcomputers 1*a*, 1*b*, and includes three input terminals and three output terminals. The three input terminals in the current input I/F 8 are connected to the three output terminals of the current detection unit 7. The detected currents related to the U phase drive current, the V phase drive current, and the W phase drive current from the current detection unit 7 are input to each of the three input terminals of the current input I/F 8.

The current input I/F 8 generates a U phase conversion current signal, a V phase conversion current signal, and a W phase conversion current signal that correspond to each of the detected currents of the U phase drive current, the V phase drive current and the W phase drive current. The aforementioned signals that are generated by the current input I/F 8 in the present description are collectively referred to as the "current detection signal". In other words, the current input I/F 8 is an interface circuit that generates the current detection signal, which is a digital signal, based off of the detected current that is detected by the current detection unit 7, which is an analog value.

The three output terminals in the current input I/F 8 are connected to each of the three input terminals in each of the microcomputers 1*a* and 1*b*. The current input I/F 8 outputs the U phase conversion current signal, the V phase conversion current signal, and the W phase conversion current signal to the microcomputers 1*a* and 1*b* via the three output terminals.

Although not shown in FIG. 1, a power supply circuit to conduct voltage conversion is connected to the battery 9. The main control unit A1, the auxiliary control unit A2, the current detection unit 7, and the current input I/F 8 operate by a power supply voltage (for example, 5V) supplied by the above power supply circuit.

The first signal cut off switch 3*a* and the first switch control unit 4*a* configure a first switcher 100*b*, and the second signal cut off switch 3*b* and the second switch control unit 4*b* configure a second switcher 100*c*. The current detection unit 7 and the current input I/F 8 configure a drive current detector 100*a*.

Next, an operation of a motor control device 100 and an electric power steering device according to the first embodiment having the aforementioned configuration is explained.

The first microcomputer 1*a* calculates target values (target current values) of the U phase drive current, the V phase drive current, and the W phase drive current that flow to the motor 6, in the main control unit A1. The current detection unit 7 detects the U phase drive current, the V phase drive current, and the W phase drive current that actually flow to the motor 6 as the detected currents, and outputs the detected currents to the first microcomputer 1*a* via the current input I/F 8. The first microcomputer 1*a* generates the control signals S1 to S6 so that the aforementioned target currents and the detected currents match, and outputs the generated control signals to the first pre-driver 2*a*.

The first pre-driver 2*a* generates the gate signals Sg1 to Sg6 based on the aforementioned gate control signals S1 to S6, and outputs the generated gate signals to the motor drive circuit 5 via the first signal cut off switch 3*a*. By supplying the U phase drive current, the V phase drive current, and the W phase drive current to the motor 6 based on the gate signals Sg1 to Sg6, the motor drive circuit 5 rotationally drives the motor 6.

The second microcomputer 1*b* calculates target values (target current values) of the U phase drive current, the V phase drive current, and the W phase drive current that flow to the motor 6, in the auxiliary control unit A2. The current detection unit 7 detects the U phase drive current, the V phase drive current, and the W phase drive current that actually flow to the motor 6 as the detected currents, and outputs the detected currents to the second microcomputer 1*b* via the current input I/F 8. The second microcomputer 1*b* generates the control signals S1 to S6 so that the aforementioned target currents and the detected currents match, and outputs the generated control signals to the second pre-driver 2*b*.

The second pre-driver 2*b* generates the gate signals Sg1 to Sg6 based on the aforementioned gate control signals S1 to S6, and outputs the generated gate signals to the motor drive circuit 5 via the second signal cut off switch 3*b*. By supplying the U phase drive current, the V phase drive current, and the W phase drive current to the motor 6 based on the aforementioned gate signals Sg1 to Sg6, the motor drive circuit 5 rotationally drives the motor 6.

The first signal cut off switch 3*a* in the main control unit A1 controls the output state (output/no output) of the gate signals Sg1 to Sg6 by the first switching signal that is input from the first switch control unit 4*a*. The second signal cut off switch 3*b* in the auxiliary control unit A2 controls the output state (output/no output) of the gate signals Sg1 to Sg6 by the second switching signal that is input from the second switch control unit 4*b*.

When the second signal cut off switch 3*b* in the auxiliary control unit A2 outputs the gate signals Sg1 to Sg6 to the motor drive circuit 5, the first signal cut off switch 3*a* in the main control unit A1 cuts off output of the gate signals Sg1 to Sg6 to the motor drive circuit 5, and makes it to where control of the motor 6 by the auxiliary control unit A2 is not hindered.

On the other hand, when the first signal cut off switch 3*a* in the main control unit A1 outputs the gate signals Sg1 to Sg6 to the motor drive circuit 5, the second signal cut off switch 3*b* in the auxiliary control A2 cuts off output of the gate signals Sg1 to Sg6 to the motor drive circuit 5, and makes it to where control of the motor 6 by the main control unit A1 is not hindered.

In other words, the motor drive circuit 5 rotationally drives to the motor 6 by generating a U phase drive current, a V phase drive current, and a W phase drive current based on the gate signals Sg1 to Sg6 that are input from either one of the main control unit A1 or the auxiliary control unit A2.

As explained above, the motor control device 100 according to the first embodiment includes a motor drive circuit 5 that outputs a drive current to the motor 6, the drive current detector 100*a* which detects the drive current, the main control unit A1, and the auxiliary control unit A2. The motor drive circuit 5 is driven by a drive signal (gate signals Sg1 to Sg6) that is output from the main control unit A1 or the auxiliary control unit A2. The main control unit A1 has a first control signal generator (the first microcomputer 1*a*) that generates a first control signal (the gate control signals S1 to S6) based on the current detection signal (the U phase conversion current signal, the V phase conversion current signal, and the W phase conversion current signal) that is input from the drive current detector 100*a*, a first drive signal generator (the first pre-driver 2*a*) that generates the drive signal based on the first control signal, and the first switcher 100*b* that switches the output state of the drive signal to the motor drive circuit 5. The auxiliary control unit A2 has a second control signal generator (the second microcomputer 1*b*) that generates the second control signal (the gate control signals S1 to S6) based on the current detection signal (the U phase conversion current signal, the V phase conversion current signal, and the W phase conversion current signal) that is input from the drive current detector 100*a*, a second drive signal generator (the second pre-driver 2*b*) that generates the drive signal based on the second control signal, and the second switcher 100*c* that switches the output state of the drive signal to the motor drive circuit 5.

From the above motor control device 100, a drive signal generator and a switcher are provided for each of control units A1 and A2. Therefore, even if an abnormality occurs in one of the drive signal generators provided in either of the control units A1 or A2, it is possible to continue control to the motor 6 by using the other drive signal generator. As such, it is possible to provide the motor control device 100 that is more stable against abnormality occurrence. After deliberate consideration, the inventors have concluded that pre-driver malfunctions especially occupy a large percentage of abnormalities, in terms of abnormality occurrence in the motor control device. Therefore, when the pre-driver is used as the drive control signal generator, the configuration of the motor control device 100 in the present embodiment demonstrates excellent results. It is therefore possible to meet the C standards of the automotive safety level (ASIL: Automotive Safety Integrity Level).

According to the first embodiment, the first pre-driver 2*a*, the first signal cut off switch 3*a*, and the first switch control unit 4*a* are provided in the main control unit A1. The second pre-driver 2*b*, the second signal cut off switch 3*b*, and the second switch control unit 4*b* are provided in the auxiliary control unit A2. According to such configuration, when the main control unit A1 is driving the motor 6, the second signal cut off switch 3*b* is used to cut off output from the auxiliary control unit A2. Therefore, it is possible to prevent the drive of the motor 6 from being interfered with by the main control unit A1. It is also possible to prevent voltage shortage of the drive signal and delay occurrences that result from wrapping around of the main control unit A1 by the output from the auxiliary control unit A2. Similarly, when the auxiliary control unit A2 drives the motor 6, the first signal cut off switch 3*a* is used to cut off output from the main control unit A1. Therefore, it is possible to prevent having the drive of the motor 6 by the auxiliary control unit A2 be interfered with. It is also possible to prevent voltage shortage of the drive signal and delay occurrences that result from wrapping around of the auxiliary control unit A2 by the output from the main control unit A1.

Second Embodiment

Next, the motor control device 100 and an electric power steering device according to a second embodiment are explained. Since fundamental configurations of the motor control device 100 and the electric power steering device are similar to those of the first embodiment, explanations that follow mainly focus on differing aspects. Components having similar functions as components explained in the first embodiment have the same names and reference symbols affixed thereto, with detailed explanations being omitted in the explanations below.

Figure 2:
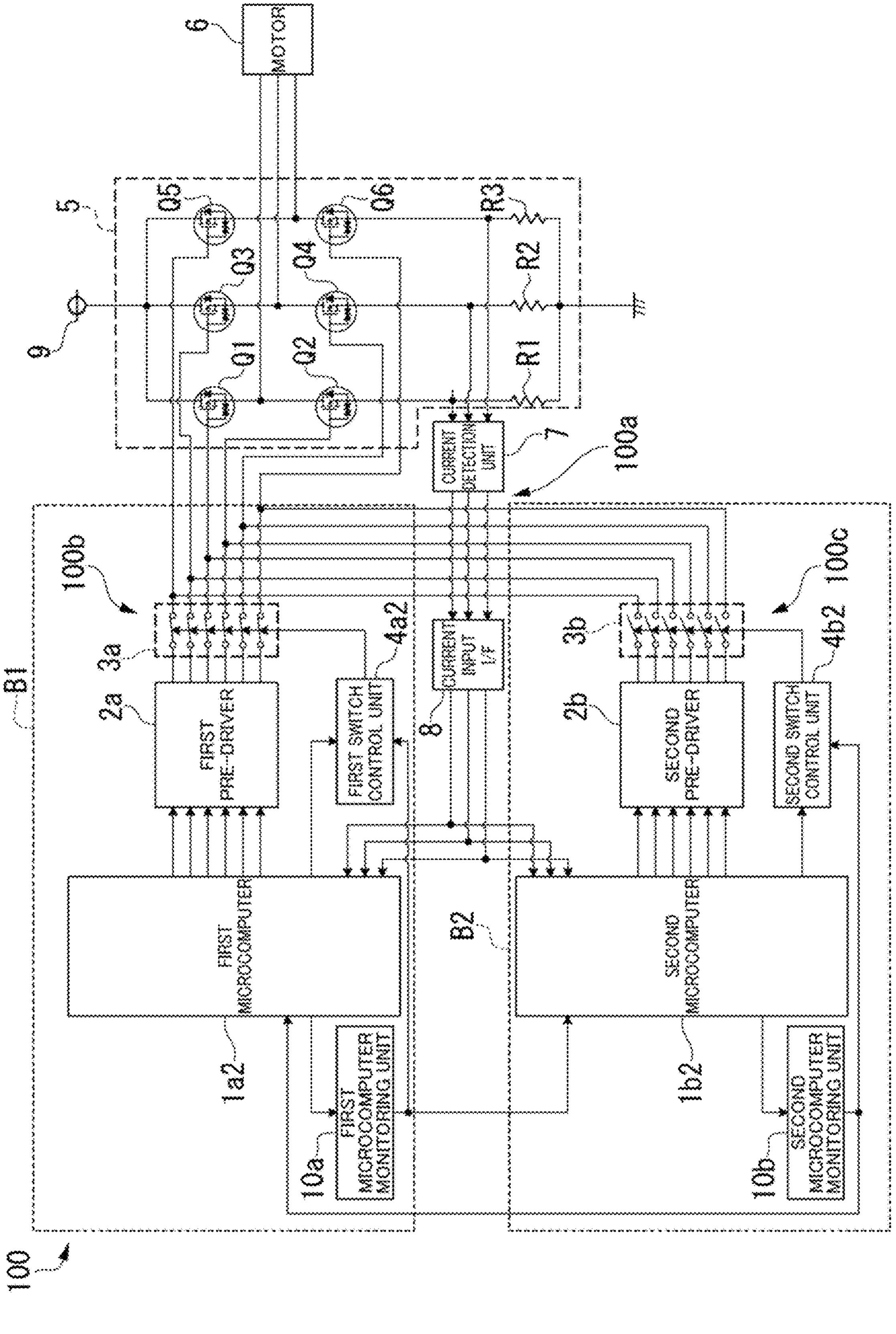
FIG. 2 A block diagram showing an overall configuration of the motor control device according to a second embodiment.

As shown in FIG. 2, the motor control device 100 according to the second embodiment includes a main control unit B1 and an auxiliary control unit B2. The main control unit B1 includes a first microcomputer 1*a*2 instead of the first microcomputer 1*a* of the first embodiment, and includes a first switch control unit 4*a*2 instead of the first switch control unit 4*a* of the first embodiment. The auxiliary control unit B2 includes a second microcomputer 1*b*2 instead of the second microcomputer 1*b* of the first embodiment, and includes a second switch control unit 4*b*2 instead of the second switch control unit 4*b* of the first embodiment.

Compared to the main control unit A1 of the first embodiment, a first microcomputer monitoring unit 10*a* is added to the main control unit B1. Compared to the auxiliary control unit A2 of the first embodiment, a second microcomputer monitoring unit 10*b* is added to the auxiliary control unit B2.

In addition to the six output terminals and the three input terminals in the first microcomputer 1*a* of the first embodiment, the first microcomputer 1*a*2 includes two output terminals and one input terminal. One of the two output terminals in the first microcomputer 1*a*2 is connected to the first microcomputer monitoring unit 10*a*. The first microcomputer 1*a*2 outputs a signal (a first operation state signal) that shows an operation state of the first microcomputer 1*a*2 to the first microcomputer monitoring unit 10*a* via the one output terminal.

The other of the two output terminals in the first microcomputer 1*a*2 is connected to the first switch control unit 4*a*2. The first microcomputer 1*a*2 outputs a first output command signal to the first switch control unit 4*a*2 via the other output terminal. The first output command signal is a signal that outputs the first switching signal which sets the first signal cut off switch 3*a* to a conductive state, to the first switch control unit 4*a*2.

The one input terminal in the first microcomputer 1*a*2 is connected to the second microcomputer monitoring unit 10*b*. A second abnormality signal is input from the second microcomputer monitoring unit 10*b* to the first microcomputer 1*a*2 via the one input terminal. The first microcomputer 1*a*2 recognizes an abnormality of the second microcomputer 1*b*2 based on the second abnormality signal.

In addition to the six output terminals and the three input terminals in the second microcomputer 1*b* of the first embodiment, the second microcomputer 1*b*2 includes two output terminals and one input terminal. One of the two output terminals in the second microcomputer 1*b*2 is connected to the second microcomputer monitoring unit 10*b*. The second microcomputer 1*b*2 outputs a signal (a second operation state signal) that shows an operation state of the second microcomputer 1*b*2 to the second microcomputer monitoring unit 10*b* via the one output terminal.

The other of the two output terminals in the second microcomputer 1*b*2 is connected to the second switch control unit 4*b*2. The second microcomputer 1*b*2 outputs a second output command signal to the second switch control unit 4*b*2 via the other output terminal. The second output command signal is a signal that outputs the second switching signal which sets the second signal cut off switch 3*b* to a conductive state, to the second switch control unit 4*b*2.

The one input terminal in the second microcomputer 1*b*2 is connected to the first microcomputer monitoring unit 10*a*. A first abnormality signal is input from the first microcomputer monitoring unit 10*a* to the second microcomputer 1*b*2 via the one input terminal. The second microcomputer 1*b*2 recognizes an abnormality of the first microcomputer 1*a*2 based on the first abnormality signal.

The first microcomputer monitoring unit 10*a* includes one input terminal and one output terminal. The input terminal of the first microcomputer monitoring unit 10*a* is connected to the one output terminal in the first microcomputer 1*a*2. The output terminal of the first microcomputer monitoring unit 10*a* is connected to the first switch control unit 4*a*2 and the second microcomputer 1*b*2.

The first microcomputer monitoring unit 10*a* monitors the operation state of the first microcomputer 1*a*2 based on the first operation state signal that is input from the first microcomputer 1*a*2. When the first microcomputer monitoring unit 10*a* determines that the operation state of first microcomputer 1*a*2 is abnormal, the first microcomputer monitoring unit 10*a* outputs the first abnormality signal which shows the abnormality, to the first switch control unit 4*a*2 and the second microcomputer 1*b*2.

In FIG. 2, the first microcomputer monitoring unit 10*a* is illustrated as a component that is separate from the first microcomputer 1*a*2. The first microcomputer monitoring unit 10*a* however, may be the same configuration component as the first microcomputer 1*a*2. In other words, the first microcomputer monitoring unit 10*a* may be a functional component realized by a control program stored in advance in the first microcomputer 1*a*2.

The second microcomputer monitoring unit 10*b* includes one input terminal and one output terminal. The input terminal of the second microcomputer monitoring unit 10*b* is connected to the second microcomputer 1*b*2. The output terminal of the second microcomputer monitoring unit 10*b* is connected to the second switch control unit 4*b*2 and the first microcomputer 1*a*2.

The second microcomputer monitoring unit 10*b* monitors the operation state of the second microcomputer 1*b*2 based on the second operation state signal that is input from the second microcomputer 1*b*2. When the second microcomputer monitoring unit 10*b* determines that the operation state of second microcomputer 1*b*2 is abnormal, the second microcomputer monitoring unit 10*b* outputs the second abnormality signal which shows the abnormality, to the second switch control unit 4*b*2 and the first microcomputer 1*a*2.

In FIG. 2, the second microcomputer monitoring unit 10*b* is illustrated as a component that is separate from the second microcomputer 1*b*2. The second microcomputer monitoring unit 10*b* however, may be the same internal configuration component as the second microcomputer 1*b*2. In other words, the second microcomputer monitoring unit 10*b* may be a functional component realized by a control program stored in advance in the second microcomputer 1*b*2.

The first switch control unit 4*a*2 includes two input terminals, and one output terminal. One of the two input terminals of the first switch control unit 4*a*2 is connected to the first microcomputer monitoring unit 10*a*. The other of the two input terminals of the first switch control unit 4*a*2 is connected to the first microcomputer 1*a*2. The output terminal of the first switch control unit 4*a*2 is connected to the control input terminal in the first signal cut off switch 3*a*.

The first switch control unit 4*a*2 generates the first switching signal based on the first abnormality signal that is input from the first microcomputer monitoring unit 10*a* and a first command signal that is input from the first microcomputer 1*a*2, and outputs the first switching signal to the first signal cut off switch 3*a*.

The second switch control unit 4*b*2 includes two input terminals, and one output terminal. One input terminal of the second switch control unit 4*b*2 is connected to the second microcomputer monitoring unit 10*b*. The other input terminal of the second switch control unit 4*b*2 is connected to the second microcomputer 1*b*2. The one output terminal of the second switch control unit **4*b*2 is connected to the control input terminal in the second signal cut off switch 3*b***.

The second switch control unit **4*b*2 generates the second switching signal based on the second abnormality signal that is input from the second microcomputer monitoring unit 10*b* and a second command signal that is input from the second microcomputer 1*b*2, and outputs the second switching signal to the second signal cut off switch 3*b***.

When the first microcomputer monitoring unit **10*a* in the main control unit B1 of the motor control device 100 and the electric power steering device according to the second embodiment detects an abnormality of the first microcomputer 1*a*2, the first microcomputer monitoring unit 10*a* outputs the first abnormality signal to the first switch control unit 4*a*2 and the second microcomputer 1*b*2**.

As a result, the first switch control unit **4*a*2 in the main control unit B1 outputs the first switching signal, which makes the gate control signals S1 to S6 into no output, to the first signal cut off switch 3*a*, and output of the gate signals Sg1 to Sg6 to the motor drive circuit 5** is cut off.

At such time, the second microcomputer **1*b*2 outputs the second command signal that commands the output of the gate signals Sg1 to Sg6 of the motor drive circuit 5 to the second switch control unit 4*b*2. The second switch control unit 4*b*2 outputs the second switching signal to the second signal cut off switch 3*b*, so as to have the gate signals Sg1 to Sg6 that are input from the second pre-driver 2*b* be output to the motor drive circuit 5. As a result, the gate signals Sg1 to Sg6 are output to the motor drive circuit 5 from the auxiliary control unit B2, instead of the main control unit B1**.

On the other hand, when the second microcomputer monitoring unit **10*b* detects an abnormality of the second microcomputer 1*b*2, the second microcomputer monitoring unit 10*b* outputs the second abnormality signal to the second switch control unit 4*b*2 and the first microcomputer 1*a*2. The second switch control unit 4*b*2 then outputs the second switching signal, which makes the gate control signals S1 to S6 into no output, to the second signal cut off switch 3*b*, and output of the gate signals Sg1 to Sg6 to the motor drive circuit 5** is cut off.

At such time, first microcomputer **1*a*2 outputs the first command signal that commands the output of the gate signals Sg1 to Sg6 of the motor drive circuit 5 to the first switch control unit 4*a*2. The first switch control unit 4*a*2 outputs the first switching signal to the first signal cut off switch 3*a*, so as to have the gate signals Sg1 to Sg6 that are input from the first pre-driver 2*a* be output to the motor drive circuit 5. As a result, the gate signals Sg1 to Sg6 are output to the motor drive circuit 5 from the main control unit B1, instead of the auxiliary control unit B2**.

As explained above, the motor control device 100 according to the second embodiment further includes a first control signal generator monitoring unit (the first microcomputer monitoring unit **10*a*) that monitors an operation state of the first control signal generator (the first microcomputer 1*a*2), and outputs the first abnormality signal to the first switcher 100*b* and the second control signal generator (the second microcomputer 1*b*2) when the first control signal generator monitoring unit determines that an abnormality is occurring in the first control signal generator, and further includes a second control signal generator monitoring unit (second microcomputer monitoring unit 10*b*) that monitors an operation state of the second control signal generator, and outputs the second abnormality signal to the second switcher 100*c* and the first control signal generator when the second control signal generator monitoring unit determines that an abnormality is occurring in the second control signal generator. The drive signal (gate signals Sg1 to Sg6) is output to the motor drive circuit 5 from the control unit having no abnormality out of the main control unit B1 and the auxiliary control unit B2**.

With the above configuration, the drive signal from the control unit having no abnormality out of the main control unit B1 and the auxiliary control unit B2 is output to the motor drive circuit 5. Therefore, it is possible to further increase stability against abnormality occurrences.

Third Embodiment

Next, the motor control device 100 and an electric power steering device according to a third embodiment are explained. Since fundamental configurations of the motor control device 100 and the electric power steering device are similar to those of the first embodiment, explanations that follow mainly focus on differing aspects. Components having similar functions as components explained in the first embodiment have the same names and reference symbols affixed thereto, with detailed explanations being omitted in the explanations below.

Figure 3:
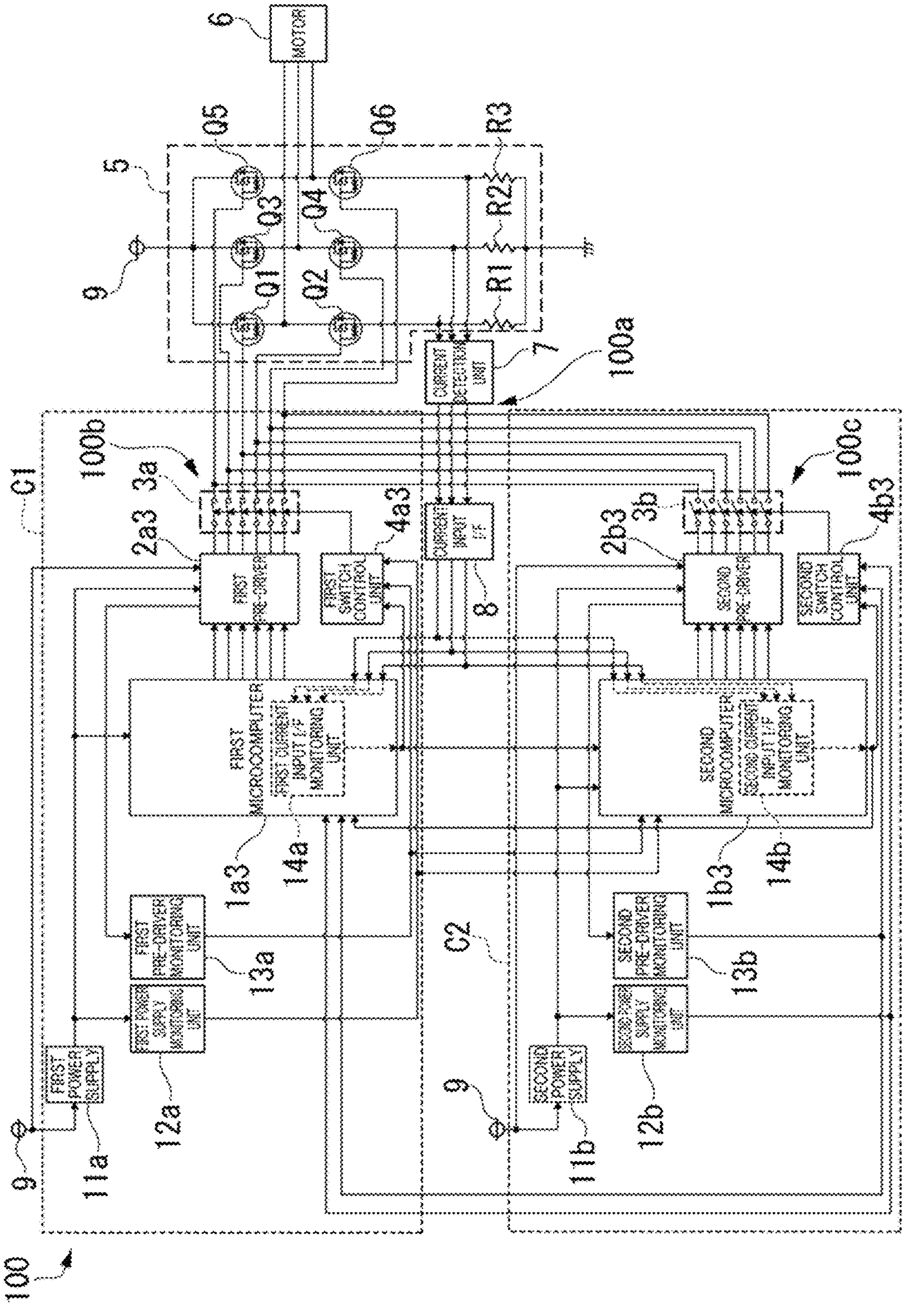
FIG. 3 A block diagram showing an overall configuration of the motor control device according to a third embodiment.

As shown in FIG. 3, the motor control device 100 according to the third embodiment includes a main control unit C1 and an auxiliary control unit C2. The main control unit C1 includes a first microcomputer **1*a*3 instead of the first microcomputer 1*a* of the first embodiment, includes a first pre-driver 2*a*3 instead of the first pre-driver 2*a* of the first embodiment, and includes a first switch control unit 4*a*3 instead of the first switch control unit 4*a* of the first embodiment. The auxiliary control unit C2 includes a second microcomputer 1*b*3 instead of the second microcomputer 1*b* of the first embodiment, includes a second pre-driver 2*b*3 instead of the second pre-driver 2*b* of the first embodiment, and includes a second switch control unit 4*b*3 instead of the second switch control unit 4*b*** of the first embodiment.

Compared to the main control unit A1 of the first embodiment, a first power supply **11*a*, a first power supply monitoring unit 12*a*, and a first pre-driver monitoring unit 13*a* (first drive signal generator monitoring unit) are added to the main control unit C1. Compared to the auxiliary control unit A2 of the first embodiment, a second power supply 11*b*, a second power supply monitoring unit 12*b*, and a second pre-driver monitoring unit 13*b* (second drive signal generator monitoring unit) are added to the auxiliary control unit C2**.

The first power supply **11*a* corresponds to the power supply circuit mentioned in the first embodiment. The first power supply 11*a* includes one input terminal and one output terminal. The input terminal of the first power supply 11*a* is connected to a positive electrode of the battery 9, and the output terminal of the first power supply 11*a* is at least connected to the first power supply monitoring unit 12*a*, the first microcomputer 1*a*3, and the first pre-driver 2*a*3. The first power supply 11*a* supplies a first operation power to at least the first power supply monitoring unit 12*a*, the first microcomputer 1*a*3, and the first pre-driver 2*a*3. The first power supply 11*a*** may supply power to the other components as well.

The first power supply monitoring unit **12*a* includes one input terminal and one output terminal. The input terminal of the first power supply monitoring unit 12*a* is connected to the first power supply 11*a*, and the output terminal of the first power supply monitoring unit 12*a* is connected to the first switch control unit 4*a*3 and the second microcomputer 1*b*3**.

The first power supply monitoring unit 12*a* monitors an operation state of the first power supply 11*a* based on the first operation power that is input from the first power supply 11*a*. The first power supply monitoring unit 12*a* outputs a first power supply abnormality signal to the first switch control unit 4*a*3 and the second microcomputer 1*b*3, when the first power supply monitoring unit 12*a* determines that an error is occurring in the first power supply 11*a*.

The first pre-driver monitoring unit 13*a* includes one input terminal and one output terminal. The input terminal of the first pre-driver monitoring unit 13*a* is connected to the first pre-driver 2*a*3, and the output terminal of the first pre-driver monitoring unit 13*a* is connected to the first switch control unit 4*a*3 and the second microcomputer 1*b*3.

The first pre-driver monitoring unit 13*a* monitors the operation state of the first pre-driver 2*a*3 based on a first pre-driver state signal that is output from the first pre-driver 2*a*3. The first pre-driver monitoring unit 13*a* outputs a first drive abnormality signal to the first switch control unit 4*a*3 and the second microcomputer 1*b*3, when the first pre-driver monitoring unit 13*a* determines that an error is occurring in the first pre-driver 2*a*3.

Just as with the first power supply 11*a*, the second power supply 11*b* corresponds to a power supply circuit. The second power supply 11*b* includes one input terminal and one output terminal. The input terminal of the second power supply 11*b* is connected to a positive electrode of the battery 9, and the output terminal of the second power supply 11*b* is at least connected to the second power supply monitoring unit 12*b*, the second microcomputer 1*b*3, and the second pre-driver 2*b*3. The second power supply 11*b* supplies a second operation power to at least the second power supply monitoring unit 12*b*, the second microcomputer 1*b*3, and the second pre-driver 2*b*3. The second power supply 11*b* may supply power to the other components as well.

The second power supply monitoring unit 12*b* includes one input terminal and one output terminal. The input terminal of the second power supply monitoring unit 12*b* is connected to the second power supply 11*b*, and the output terminal of the second power supply monitoring unit 12*b* is connected to the second switch control unit 4*b*3 and the first microcomputer 1*a*3.

The second power supply monitoring unit 12*b* monitors an operation state of the second power supply 11*b* based on the second operation power that is input from the second power supply 11*b*. The second power supply monitoring unit 12*b* outputs a second power supply abnormality signal to the second switch control unit 4*b*3 and the first microcomputer 1*a*3, when the second power supply monitoring unit 12*b* determines that an error is occurring in the second power supply 11*b*.

The second pre-driver monitoring unit 13*b* includes one input terminal and one output terminal. The input terminal of the second pre-driver monitoring unit 13*b* is connected to the second pre-driver 2*b*3, and the output terminal of the second pre-driver monitoring unit 13*b* is connected to the second switch control unit 4*b*3 and the first microcomputer 1*a*3.

The second pre-driver monitoring unit 13*b* monitors the operation state of the second pre-driver 2*b*3 based on a second pre-driver state signal that is output from the second pre-driver 2*b*3. The second pre-driver monitoring unit 13*b* outputs the second power supply abnormality signal to the second switch control unit 4*b*3 and the first microcomputer 1*a*3, when the second pre-driver monitoring unit 13*b* determines that an error is occurring in the second pre-driver 2*b*3.

In addition to the six output terminals and the three input terminals in the first microcomputer 1*a* of the first embodiment, the first microcomputer 1*a*3 includes one output terminal, four input terminals, and a first current input I/F monitoring unit 14*a*.

The output terminal of the first microcomputer 1*a*3 is connected to the first switch control unit 4*a*3 and the second microcomputer 1*b*3. The first microcomputer 1*a*3 outputs a first current input I/F abnormality signal that is generated by the first current input I/F monitoring unit 14*a* to the first switch control unit 4*a*3 and the second microcomputer 1*b*3 via the output terminal.

An input terminal of the first microcomputer 1*a*3 is connected to the first power supply 11*a*. The first operation power from the first power supply 11*a* is input to the first microcomputer 1*a*3 via the aforementioned input terminal. The first microcomputer 1*a*3 operates based on the first operation power.

An input terminal of the first microcomputer 1*a*3 is connected to the second power supply monitoring unit 12*b*. A second power supply abnormality signal is input to the first microcomputer 1*a*3 via the aforementioned input terminal.

An input terminal of the first microcomputer 1*a*3 is connected to the second pre-driver monitoring unit 13*b*. A second drive abnormality signal is input to the first microcomputer 1*a*3 via the aforementioned input terminal.

An input terminal of the first microcomputer 1*a*3 is connected to the second microcomputer 1*b*3. A second current input I/F abnormality signal is input to the first microcomputer 1*a*3 via the aforementioned input terminal.

The first current input I/F monitoring unit 14*a* is a functional component that is provided within the first microcomputer 1*a*3. The first current input I/F monitoring unit 14*a* monitors an operation state of the current input I/F 8 based on the U phase conversion current signal, the V phase conversion current signal, and the W phase conversion current signal that are input to the first microcomputer 1*a*3 from the current input I/F 8. When first current input I/F monitoring unit 14*a* determines that an abnormality occurred in the current input I/F 8, the first current input I/F monitoring unit 14*a* outputs the first current input I/F abnormality signal which shows the abnormality to the first switch control unit 4*a*3 and the second microcomputer 1*b*3.

On the other hand, in addition to the six output terminals and the three input terminals in the second microcomputer 1*b* of the second embodiment, the second microcomputer 1*b*3 includes one output terminal, four input terminals, and the second current input I/F monitoring unit 14*b*.

The output terminal of the second microcomputer 1*b*3 is connected to the second switch control unit 4*b*3 and the first microcomputer 1*a*3. The second microcomputer 1*b*3 outputs the second current input I/F abnormality signal that is generated by the second current input I/F monitoring unit 14*b* to the second switch control unit 4*b*3 and the first microcomputer 1*a*3 via the aforementioned output terminal.

An input terminal of the second microcomputer 1*b*3 is connected to the second power supply 11*b*. A second operation power from the second power supply 11*b* is input to the second microcomputer 1*b*3 via the aforementioned input terminal. The second microcomputer 1*b*3 operates based on the second operation power.

An input terminal of the second microcomputer 1*b*3 is connected to the first power supply monitoring unit 12*a*. The first power supply abnormality signal is input to the second microcomputer 1*b*3 via the aforementioned input terminal.

An input terminal of the second microcomputer **1*b*3 is connected to the first pre-driver monitoring unit 13*a*. The first drive abnormality signal is input to the second microcomputer 1*b*3** via the aforementioned input terminal.

An input terminal of the second microcomputer **1*b*3 is connected to the first microcomputer 1*a*3. The first current input I/F abnormality signal is input to the second microcomputer 1*b*3** via the aforementioned input terminal.

The second current input I/F monitoring unit **14*b* is a functional component that is provided within the second microcomputer 1*b*3. The second current input I/F monitoring unit 14*b* monitors the operation state of the current input I/F 8 based on the U phase conversion current signal, the V phase conversion current signal, and the W phase conversion current signal that are input to the second microcomputer 1*b*3 from the current input I/F 8. When the second current input I/F monitoring unit 14*b* determines that an abnormality occurred in the current input I/F 8, the second current input I/F monitoring unit 14*b* outputs the second current input I/F abnormality signal which shows the abnormality to the second switch control unit 4*b*3 and the first microcomputer 1*a*3**.

In addition to the six input terminals and the six output terminals in the first pre-driver **2*a* of the first embodiment, the first pre-driver 2*a*3 includes one output terminal and two input terminals. The one output terminal of the first pre-driver 2*a*3 is connected to the first pre-driver monitoring unit 13*a*. The first pre-driver 2*a*3 outputs the first pre-driver state signal which shows the operation state of the first pre-driver 2*a*3 to the first pre-driver monitoring unit 13*a*** via the one output terminal.

An input terminal of the first pre-driver **2*a*3 is connected to a positive electrode of the battery 9, and a voltage (positive voltage) is input to the positive electrode. An input terminal of the first pre-driver 2*a*3 is connected to the first power supply 11*a***, and the first operation power is input thereto.

Along with generating the gate signal Sg1 to Sg6 based on the gate control signal S1 to S6, the first pre-driver **2*a*3** includes a function of generating the positive voltage, and of generating the first pre-driver state signal based on the first operation power.

In addition to the six input terminals and the six output terminals in the second pre-driver **2*b* of first embodiment, the second pre-driver 2*b*3 includes one output terminal and two input terminals. The one output terminal of the second pre-driver 2*b*3 is connected to the second pre-driver monitoring unit 13*b*, and outputs the second pre-driver state signal which shows the operation state of the second pre-driver 2*b*3 to the second pre-driver monitoring unit 13*b***.

One input terminal of the second pre-driver **2*b*3 is connected to the positive electrode of the battery 9, and a voltage (positive voltage) is input to the positive electrode. The other input terminal of the second pre-driver 2*b*3 is connected to the second power supply 11*b***, and a second operation power is input thereto.

Along with generating the gate signal Sg1 to Sg6 from the gate control signal S1 to S6, the second pre-driver **2*b*3** includes a function of generating the positive voltage, and of generating the second pre-driver state signal based on the second operation power.

The first switch control unit **4*a*3** includes three input terminals and one output terminal.

An input terminal of the first switch control unit **4*a*3 is connected to the first power supply monitoring unit 12*a***, and the first power supply abnormality signal is input thereto.

An input terminal of the first switch control unit **4*a*3 is connected to the first pre-driver monitoring unit 13*a***, and the first drive abnormality signal is input thereto.

An input terminal of the first switch control unit **4*a*3 is connected to the first microcomputer 1*a*3, and the first current input I/F abnormality signal that is output from the first current input I/F monitoring unit 14*a*** is input thereto.

The first switch control unit **4*a*3 generates the first switching signal based on the first power supply abnormality signal, the first drive abnormality signal and the first current input I/F abnormality signal, and outputs the first switching signal to the first signal cut off switch 3*a*. In other words, when any one of the first power supply abnormality signal, the first drive abnormality signal, or the first current input I/F abnormality signal is input, the first switch control unit 4*a*3 cuts off output of the gate signal Sg1 to Sg6 from the first signal cut off switch 3*a* to the motor drive circuit 5**.

The second switch control unit **4*b*3** includes three input terminals and one output terminal.

An input terminal of the second switch control unit **4*b*3 is connected to the second power supply monitoring unit 12*b***, and the second power supply abnormality signal is input thereto.

An input terminal of the second switch control unit **4*b*3 is connected to the second pre-driver monitoring unit 13*b***, and the second drive abnormality signal is input thereto.

An input terminal of the second switch control unit **4*b*3 is connected to the second microcomputer 1*b*3, and the second current input I/F abnormality signal that is output from the second current input I/F monitoring unit 14*b*** is input thereto.

The second switch control unit **4*b*3 generates the second switching signal based on the second power supply abnormality signal, the second drive abnormality signal and the second current input I/F abnormality signal, and outputs the second switching signal to the second signal cut off switch 3*b*. In other words, when any one of the second power supply abnormality signal, the second drive abnormality signal, or the second current input I/F abnormality signal is input, the second switch control unit 4*b*3 cuts off output of the gate signal Sg1 to Sg6 from the second signal cut off switch 3*b* to the motor drive circuit 5**.

The first current input I/F monitoring unit **14*a* corresponds to a first detector monitoring unit, and the second current input I/F monitoring unit 14*b* corresponds to a second detector monitoring unit. The first current input I/F abnormality signal output by the first current input I/F monitoring unit 14*a* corresponds to a first current detection abnormality signal. The second current input I/F abnormality signal output by the second current input I/F monitoring unit 14*b*** corresponds to a second current detection abnormality signal.

In the motor control device 100 and an electric power steering device according to the third embodiment, the first switch control unit **4*a*3 outputs the first switching signal to the first signal cut off switch 3*a* when an abnormality occurs in any one of the first power supply 11*a*, the first pre-driver 2*a*3, or the current input I/F 8. As such, output of the gate signals Sg1 to Sg6 from the first signal cut off switch 3*a* to the motor drive circuit 5** is cut off.

On the other hand, the second switch control unit **4*b*3 outputs the second switching signal to the second signal cut off switch 3*b* when an abnormality occurs in any one of the second power supply 11*b*, the second pre-driver 2*b*3, or the current input I/F 8. As such, output of the gate signals Sg1 to Sg6 from the second signal cut off switch 3*b* to the motor drive circuit 5** is cut off.

As explained above, the motor control device 100 according to the present embodiment further includes a first drive signal generator monitoring unit (first pre-driver monitoring unit 13*a*) that monitors an operation state of the first drive signal generator (first pre-driver 2*a*3), and outputs the first drive abnormality signal to the first switcher 100*b* and the second control signal generator (the second microcomputer 1*b*3) when the first drive signal generator monitoring unit determines that an abnormality is occurring in the first drive signal generator, and further includes a second drive signal generator monitoring unit (second pre-driver monitoring unit 13*b*) that monitors an operation state of the second drive signal generator (second pre-driver 2*b*3), and outputs the second drive abnormality signal to the second switcher 100*c* and the first control signal generator when the second drive signal generator monitoring unit determines that an abnormality is occurring in the second drive signal generator. The drive signal is output to the motor drive circuit 5 from the control unit having no abnormality out of the main control unit C1 and the auxiliary control unit C2. With such configuration, by monitoring the operation state of the first drive signal generator and of the second drive signal generator, it is possible to further increase stability against abnormality occurrences in the aforementioned drive signal generators.

The motor control device 100 according to the present embodiment further includes the first power supply 11*a* that supplies operation power to the first control signal generator (the first microcomputer 1*a*3) and the first drive signal generator (the first pre-driver 2*a*3), the second power supply 11*b* that supplies operation power to the second control signal generator (the second microcomputer 1*b*3) and the second drive signal generator (the second pre-driver 2*b*3), the first power supply monitoring unit 12*a* that monitors the operation state of the first power supply 11*a*, and outputs the first power supply abnormality signal to the first switcher 100*b* and the second control signal generator when the first power supply monitoring unit 12*a* determines that an abnormality is occurring in the first power supply 11*a*, and the second power supply monitoring unit 12*b* that monitors the operation state of the second power supply 11*b*, and outputs the second power supply abnormality signal to the second switcher 100*c* and the first control signal generator when the second power supply monitoring unit 12*b* determines that an abnormality is occurring in the second power supply 11*b*. The drive signal is output to the motor drive circuit 5 from the control unit having no abnormality out of the main control unit C1 and the auxiliary control unit C2. With such configuration, by monitoring the operation state of the first power supply 11*a* and the second power supply 11*b*, it is possible to further increase stability of power supplies 11*a* and 11*b* against abnormality occurrences.

The motor control device 100 according to the present embodiment further includes the first detector monitoring unit (the first current input I/F monitoring unit 14*a*) that is provided in the main control unit C1, that monitors the operation state of the drive current detector 100*a*, and that outputs the first current detection abnormality signal to the first switcher 100*b* and the second control signal generator when the first detector monitoring unit determines that an abnormality is occurring in the drive current detector 100*a*, and the second detector monitoring unit (second current input I/F monitoring unit 14*b*) that is provided in the auxiliary control unit C2, that monitors the operation state of the drive current detector 100*a*, and that outputs the second current detection abnormality signal to the second switcher 100*c* and the first control signal generator when the second detector monitoring unit determines that an abnormality is occurring in the drive current detector 100*a*.

In addition to the effects explained in the configuration of the second embodiment, it is possible to increase abnormality detection rate in the main unit control C1 and the auxiliary control unit C2 with the aforementioned configuration of the third embodiment. According to the third embodiment, it is also possible to detect abnormality occurrence in the current input I/F 8. Therefore, it is possible to realize more accurate switching of the control unit, and it is possible to further increase stability against abnormality occurrences.

Fourth Embodiment

Next, the motor control device 100 and an electric power steering device according to a fourth embodiment are explained. Since fundamental configurations of the motor control device 100 and the electric power steering device are similar to those of the third embodiment, explanations that follow mainly focus on differing aspects. Components having similar functions as components explained in the third embodiment have the same names and reference symbols affixed thereto, with detailed explanations being omitted in the explanations below.

Figure 4:
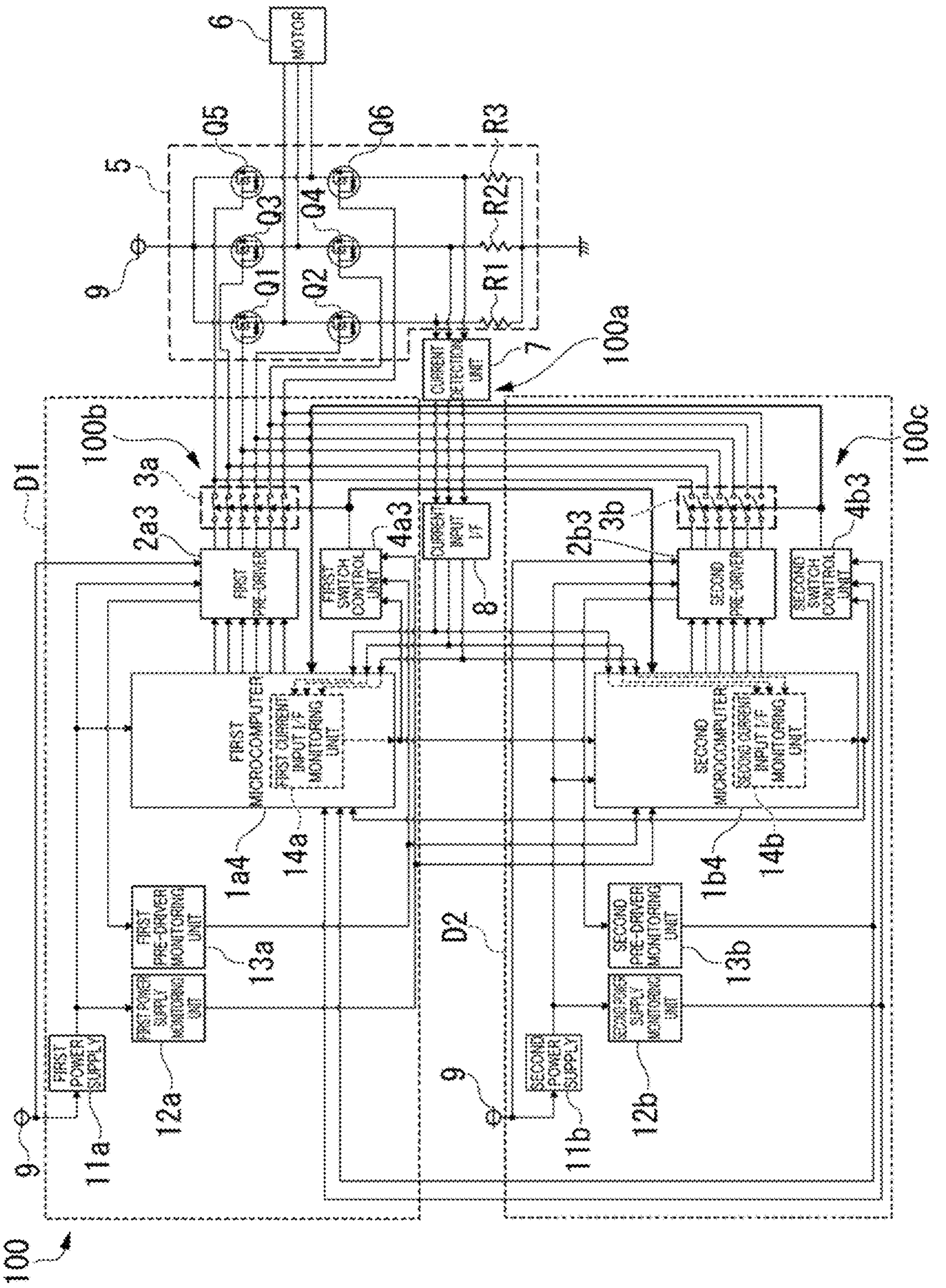
FIG. 4 A block diagram showing an overall configuration of the motor control device according to a fourth embodiment.

As shown in FIG. 4, the motor control device 100 according to the fourth embodiment includes a main control unit D1 and an auxiliary control unit D2. The main control unit D1 includes a first microcomputer 1*a*4 instead of the first microcomputer 1*a*3 of the third embodiment. The auxiliary control unit D2 includes a second microcomputer 1*b*4 instead of the second microcomputer 1*b*3 of the third embodiment.

Compared to the first microcomputer 1*a*3 of the third embodiment, the first microcomputer 1*a*4 has an additional input terminal. The aforementioned input terminal is connected to the second switch control unit 4*b*3. The first microcomputer 1*a*4 recognizes an operation state of the second switch control unit 4*b*3 based on the second switching signal that is input from the second switch control unit 4*b*3.

Compared to the second microcomputer 1*b*3 of the third embodiment, the second microcomputer 1*b*4 has an additional input terminal. The aforementioned input terminal is connected to the first switch control unit 4*a*3. The second microcomputer 1*b*4 recognizes an operation state of the first switch control unit 4*a*3 based on the first switching signal that is input from the first switch control unit 4*a*3.

In the third embodiment, when an abnormality of the first power supply 11*a* is inadvertently determined by the second microcomputer 1*b*3 for example, there is possibility that the gate signals Sg1 to Sg6 are input to the motor drive circuit 5 from both the main control unit C1 and the auxiliary control unit C2.

In response to such problem, in the first microcomputer 1*a*4 of the fourth embodiment, the second switching signal is input from the second switch control unit 4*b*3. As such, in a state where the auxiliary control unit D2 outputs the gate signals Sg1 to Sg6 to the motor drive circuit 5, the main control unit D1 does not output the gate signals Sg1 to Sg6 to the motor drive circuit 5.

In the second microcomputer 1*b*4, the first switching signal is input from the first switch control unit 4*a*3. As such, in a state where the main control unit D1 outputs the gate signals Sg1 to Sg6 to the motor drive circuit 5, the auxiliary control unit D2 does not output the gate signals Sg1 to Sg6 to the motor drive circuit 5.

As explained above, the main control unit D1 outputs a drive signal (the gate signals Sg1 to Sg6) to the motor drive circuit 5 via the first switcher 100*b* only when the second switcher 100*c* does not output the drive signal to the motor drive circuit 5, and the auxiliary control unit D2 outputs the drive signal to the motor drive circuit 5 via the second switcher 100*c* only when the first switcher 100*b* does not output the drive signal the motor drive circuit 5. From such configuration, it is possible to avoid having the gate signals Sg1 to Sg6 be outputted to the motor drive circuit 5 from both the main control unit D1 and the auxiliary control unit D2.

Fifth Embodiment

Next, the motor control device 100 and an electric power steering device according to a fifth embodiment are explained. Since fundamental configurations of the motor control device 100 and the electric power steering device are similar to those of the first embodiment, explanations that follow mainly focus on differing aspects. Components having similar functions as components explained in the first embodiment have the same names and reference symbols affixed thereto, with detailed explanations being omitted in the explanations below.

Figure 5:
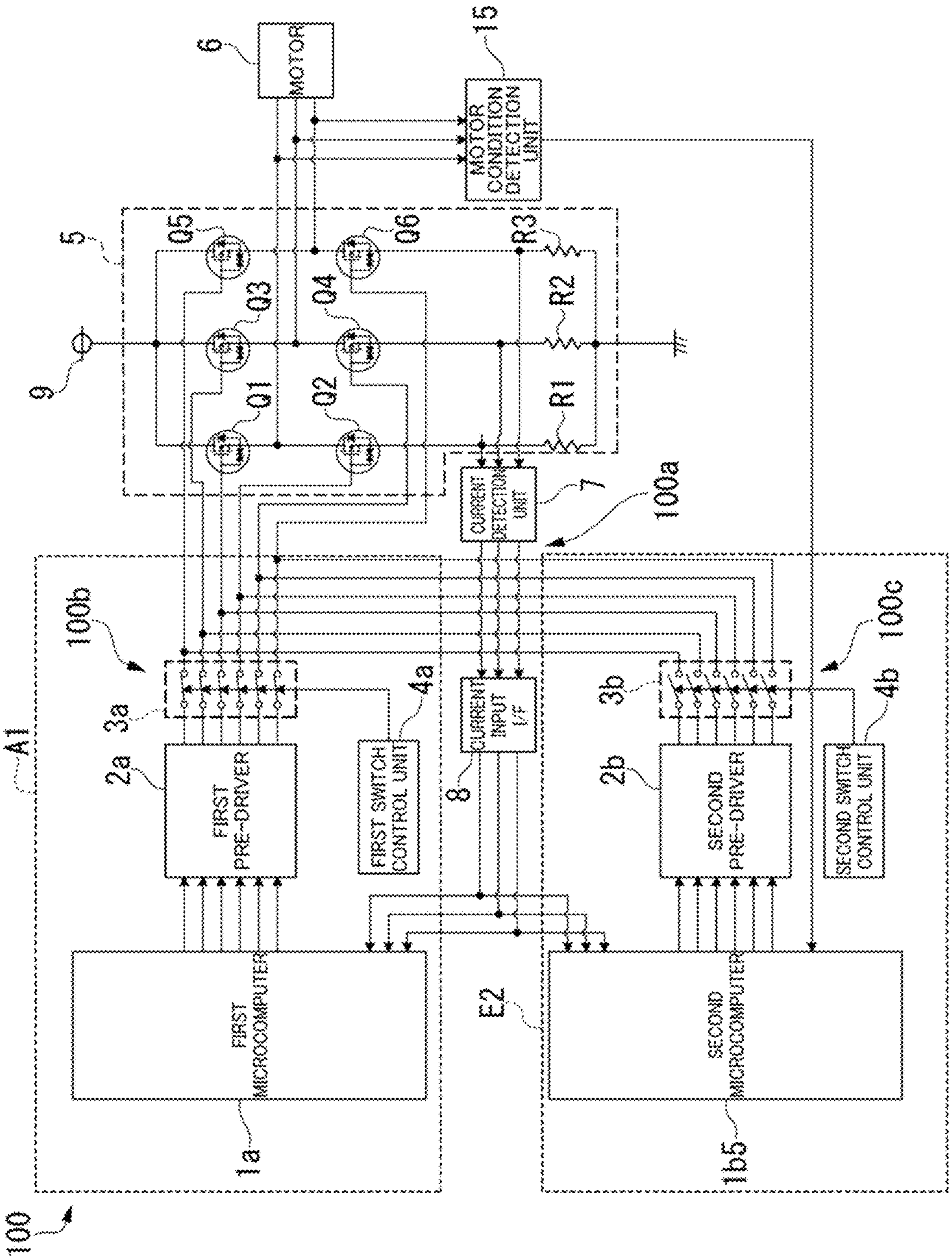
FIG. 5 A block diagram showing an overall configuration of the motor control device according to a fifth embodiment.

As shown in FIG. 5, the motor control device 100 according to the fifth embodiment includes the main control unit A1 and an auxiliary control unit E2. The auxiliary control unit E2 includes a second microcomputer 1*b*5 instead of the second microcomputer 1*b* of the first embodiment.

Compared to the motor control device 100 of the first embodiment, the motor control device 100 according to the fifth embodiment has a motor terminal state detection unit 15. The motor terminal state detection unit 15 includes three input terminals and one output terminal.

Each input terminal of the motor terminal state detection unit 15 is connected to each of a U phase switching leg, a V phase switching leg, and a W phase switching leg. The output terminal of the motor terminal state detection unit 15 is connected to the second microcomputer 1*b*5.

The motor terminal state detection unit 15 detects a state (motor terminal state) of three input terminals of the motor 6, in other words, the U phase input terminal, the V phase input terminal, and the W phase input terminal, and outputs the motor terminal state to the second microcomputer 1*b*5 as a motor terminal state detection signal.

The second microcomputer 1*b*5 conducts the operation below in a state where the supply of the gate signal Sg1 to Sg6 from the main control unit A1 to the motor drive circuit 5 is cut off, and the supply of the gate signal Sg1 to Sg6 from the auxiliary control unit E2 to the motor drive circuit 5 is being conducted. In other words, the gate control signals S1 to S6 which render all the switching transistors Q1 to Q6 that configure the motor drive circuit 5 to the OFF state (no transmission state), in other words, the gate control signals S1 to S6 that sequentially transmit to the switching transistors Q1 to Q6 individually, are output to the individually the second pre-driver 2*b*.

By referencing the motor terminal state detection signal that is input from the motor terminal state detection unit 15 in the aforementioned state, the second microcomputer 1*b*5 diagnoses failure of the auxiliary control unit E2, in other words, failures of the second pre-driver 2*b*, the second signal cut off switch 3*b*, and the second switch control unit 4*b*.

For example, in a state where the gate control signals S1 to S6 which render all of the switching transistors Q1 to Q6 in the OFF state (no transmission state) are output to the second pre-driver 2*b* by the second microcomputer 1*b*5, a case where the motor terminal state detection signal shows that any one of the switching transistors Q1 to Q6 is in the ON state (transmission state) is considered. In such case, the second microcomputer 1*b*5 determines that a failure is occurring in any one of the second pre-driver 2*b*, the second signal cut off switch 3*b*, or the second switch control unit 4*b*.

In a state where the gate control signals S1 to S6 that sequentially transmit the switching transistors Q1 to Q6 individually are output to the second pre-driver 2*b* by the second microcomputer 1*b*5, a case where the second microcomputer 1*b*5 shows the transmission state of the switching transistors Q1 to Q6 of the motor terminal state detection signal that differ from the gate control signals S1 to S6 is considered. In such case, the second microcomputer 1*b*5 determines that a failure is occurring in any one of the second pre-driver 2*b*, the second signal cut off switch 3*b*, or the second switch control unit 4*b*.

It is not possible to conduct the above failure determination in a state where the main control unit A1 or the auxiliary control unit E2 are being controlled. Therefore, the above determination is conducted in a state where the main control unit A1 and the auxiliary control unit E2 are both not controlling the motor 6, in other words, in a state where no assist by the electric power steering device is being conducted on steering operation.

As explained above, the motor control device 100 according to the present embodiment further includes the motor terminal state detection unit 15 that detects a state of the input terminal of the motor 6 as the motor terminal state. By referencing the motor terminal state (the motor terminal state detection signal output by the motor terminal state detection unit 15), the second control signal generator (the second microcomputer 1*b*5) determines the occurrence of failure in the auxiliary control unit E2. According to such a configuration, since it is possible for the auxiliary control unit E2 to diagnose failures, it is possible to further increase reliability of the motor control device 100 and electric power steering device.

Sixth Embodiment

Next, the motor control device 100 and an electric power steering device according to a sixth embodiment are explained. Since fundamental configurations of the motor control device 100 and the electric power steering device are similar to those of the first embodiment, explanations that follow mainly focus on differing aspects. Components having similar functions as components explained in the first embodiment have the same names and reference symbols affixed thereto, with detailed explanations being omitted in the explanations below.

In the motor control device 100 according to the sixth embodiment, computing power of the second microcomputer 1*b* is less than computing power of the first microcomputer 1*a*, out of the first microcomputer 1*a* and the second microcomputer 1*b* in the first embodiment.

In other words, the motor control device 100 according to the sixth embodiment does not use two microcomputers (large scale integrated circuit) with the same computing power, but a large scale integrated circuit as the second microcomputer 1*b* having less computing power than the large scale integrated circuit as the first microcomputer 1*a* is adopted.

The auxiliary control unit A2 of the first embodiment only operates when an error occurs in the main control unit A1.

Therefore using the second microcomputer 1*b* as the large scale integrated circuit having lower computing power than the first microcomputer 1*a* is enough for the motor control device 100 to function.

According to the configuration of the sixth embodiment, since the second microcomputer 1*b* having a lower computing power than the first microcomputer 1*a* is used as the large scale integrated circuit, it is possible to make the auxiliary control unit A2 even cheaper. Therefore, according to the sixth embodiment, it is possible to reduce the cost of the motor control device 100 and electric power steering device.

Seventh Embodiment

Next, the motor control device 100 and an electric power steering device according to a seventh embodiment are explained. Since fundamental configurations of the motor control device 100 and the electric power steering device are similar to those of the first embodiment, explanations that follow mainly focus on differing aspects. Components having similar functions as components explained in the first embodiment have the same names and reference symbols affixed thereto, with detailed explanations being omitted in the explanations below.

Figure 6:
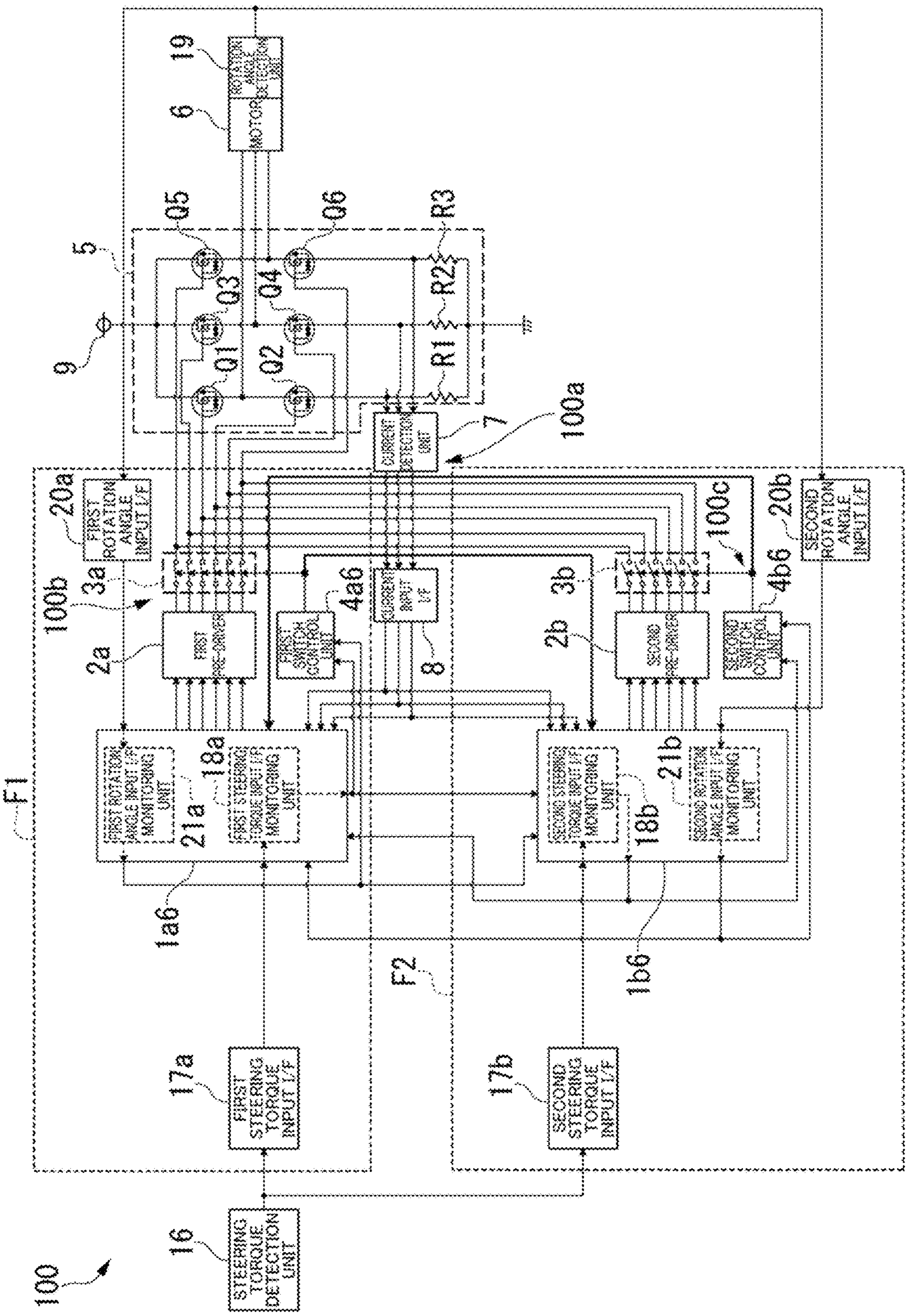
FIG. 6 A block diagram showing an overall configuration of the motor control device according to a seventh embodiment.

As shown in FIG. 6, the motor control device 100 according to the seventh embodiment includes a main control unit F1 and an auxiliary control unit F2. The main control unit F1 includes a first microcomputer 1*a*6 instead of the first microcomputer 1*a* of the first embodiment, and a first switch control unit 4*a*6 instead of the first switch control unit 4*a* of the first embodiment. The auxiliary control unit F2 includes a second microcomputer 1*b*6 instead of the second microcomputer 1*b* of the first embodiment, and a second switch control unit 4*a*6 instead of the second switch control unit 4*a* of the first embodiment.

Compared to the main control unit A1 of the first embodiment, the main control unit F1 additionally has a first steering torque input I/F 17*a* and a first rotation angle input I/F 20*a*. Compared to the auxiliary control unit A2 of the first embodiment, the auxiliary control unit F2 additionally has a second steering torque input I/F 17*b* and a second rotation angle input I/F 20*b*.

As shown in FIG. 6, the electric power steering device according to the seventh embodiment includes a steering torque detection unit 16 and a rotation angle detection unit 19.

The steering torque detection unit 16 is connected to the first steering torque input I/F 17*a* and the second steering torque input I/F 17*b*. The steering torque detection unit 16 detects a torque of steering of an automobile operator as a steering torque, and outputs a detection torque signal that shows the steering torque to the first steering torque input I/F 17*a* and the second steering torque input I/F 17*b*.

The first steering torque input I/F 17*a* includes one input terminal and one output terminal. The input terminal of the first steering torque input I/F 17*a* is connected to the steering torque detection unit 16, and the output terminal of the first steering torque input I/F 17*a* is connected to the first microcomputer 1*a*6. The first steering torque input I/F 17*a* converts a detected torque signal that is input from the steering torque detection unit 16 to a first torque conversion signal suitable for input to the first microcomputer 1*a*6, and outputs the detected torque signal to the first microcomputer 1*a*6.

The second steering torque input I/F 17*b* includes one input terminal and one output terminal. The input terminal of the second steering torque input I/F 17*b* is connected to the steering torque detection unit 16, and the output terminal of the second steering torque input I/F 17*b* is connected to the second microcomputer 1*b*6. The second steering torque input I/F 17*b* converts a detected torque signal that is input from the steering torque detection unit 16 to a second torque conversion signal suitable for input to the second microcomputer 1*b*6, and outputs the detected torque signal to the second microcomputer 1*b*6.

The rotation angle detection unit 19 includes an output terminal that is connected to the first rotation angle input I/F 20*a* and to the second rotation angle input I/F 20*b*. The rotation angle detection unit 19 detects a rotation angle of the motor 6, and outputs a rotation angle detection signal that shows the rotation angle to the first rotation angle input I/F 20*a* and the second rotation angle input I/F 20*b*.

The first rotation angle input I/F 20*a* includes one input terminal and one output terminal. The input terminal of the first rotation angle input I/F 20*a* is connected to the rotation angle detection unit 19, and the output terminal of the first rotation angle input I/F 20*a* is connected to the first microcomputer 1*a*6. The first rotation angle input I/F 20*a* converts the rotation angle detection signal that is input from the rotation angle detection unit 19 to a first rotation conversion signal suitable for input to the first microcomputer 1*a*6 and outputs the first rotation conversion signal to the first microcomputer 1*a*6.

The second rotation angle input I/F 20*b* includes one input terminal and one output terminal. The input terminal of the second rotation angle input I/F 20*b* is connected to the rotation angle detection unit 19, and the output terminal of the second rotation angle input I/F 20*b* is connected to the second microcomputer 1*b*6. The second rotation angle input I/F 20*b* converts the rotation angle detection signal that is input from the rotation angle detection unit 19 to a second rotation conversion signal suitable for input to the second microcomputer 1*b*6 and outputs the second rotation conversion signal to the second microcomputer 1*b*6.

In addition to the six output terminals and the three output terminals in the first microcomputer 1*a* of the first embodiment, the first microcomputer 1*a*6 includes five input terminals, two output terminals, a first steering torque input I/F monitoring unit 18*a*, and a first rotation angle input I/F monitoring unit 21*a*.

An input terminal of the first microcomputer 1*a*6 is connected to the first steering torque input I/F 17*a*, and the first torque conversion signal from the first steering torque input I/F 17*a* is input thereto.

An input terminal of the first microcomputer 1*a*6 is connected to the first rotation angle input I/F 20*a*, and the first rotation conversion signal from the first rotation angle input I/F 20*a* is input thereto.

An input terminal of the first microcomputer 1*a*6 is connected to the second steering torque input I/F monitoring unit 18*b*, and a second steering torque input I/F abnormality signal from the second steering torque input I/F monitoring unit 18*b* is input thereto.

An input terminal of the first microcomputer 1*a*6 is connected to the second rotation angle input I/F monitoring unit 21*b*, and a second rotation angle input I/F abnormality signal from the second rotation angle input I/F monitoring unit 21*b* is input thereto.

An input terminal of the first microcomputer 1*a*6 is connected to the second switch control unit 4*b*6, and the second switching signal from the second switch control unit 4*b*6 is input thereto.

An output terminal of the first microcomputer 1*a*6 is connected to the first switch control unit 4*a*6 and to the second microcomputer 1*b*6, and outputs a first steering torque input I/F abnormality signal that is output from the first steering torque input I/F monitoring unit 18*a* to the first switch control unit 4*a*6 and to the second microcomputer 1*b*6.

An output terminal of the first microcomputer 1*a*6 is connected to the first switch control unit 4*a*6 and to the second microcomputer 1*b*6, and outputs a first rotation angle input I/F abnormality signal that is output from the first rotation angle input I/F monitoring unit 21*a* to the first switch control unit 4*a*6 and to the second microcomputer 1*b*6.

The first steering torque input I/F monitoring unit 18*a* is a functional component that is provided within the first microcomputer 1*a*6. The first steering torque input I/F monitoring unit 18*a* includes one input terminal and one output terminal. The first steering torque input I/F monitoring unit 18*a* monitors an operation state of the first steering torque input I/F 17*a* based on the first torque conversion signal that is input from the first steering torque input I/F 17*a*. When the first steering torque input I/F monitoring unit 18*a* determines that an abnormality occurred at the first steering torque input I/F 17*a*, the first steering torque input I/F monitoring unit 18*a* outputs the first steering torque input I/F abnormality signal which shows the abnormality to the first switch control unit 4*a*6 and to the second microcomputer 1*b*6.

The first rotation angle input I/F monitoring unit 21*a* is a functional component that is provided within the first microcomputer 1*a*6. The first rotation angle input I/F monitoring unit 21*a* includes one input terminal and one output terminal. The first rotation angle input I/F monitoring unit 21*a* monitors the operation state of the first rotation angle input I/F 20*a* based on the first rotation conversion signal that is input from the first rotation angle input I/F 20*a*. When the first rotation angle input I/F monitoring unit 21*a* determines an abnormality of the first rotation angle input I/F 20*a*, the first rotation angle input I/F monitoring unit 21*a* outputs the first rotation angle input I/F abnormality signal which shows the abnormality to the first switch control unit 4*a*6 and the second microcomputer 1*b*6.

In addition to the six output terminals and the three input terminals in the second microcomputer 1*b* of the first embodiment, the second microcomputer 1*b*6 includes five input terminals, two output terminals, the second steering torque input I/F monitoring unit 18*b*, and the second rotation angle input I/F monitoring unit 21*b*.

An input terminal of the second microcomputer 1*b*6 is connected to the output terminal of the second steering torque input I/F 17*b*, and the second torque conversion signal is input from the second steering torque input I/F 17*b*.

An input terminal of the second microcomputer 1*b*6 is connected to the second rotation angle input I/F 20*b*, and the second rotation conversion signal is input from the second rotation angle input I/F 20*b*.

An input terminal of the second microcomputer 1*b*6 is connected to the first steering torque input I/F monitoring unit 18*a* in the first microcomputer 1*a*6, and the first steering torque input I/F abnormality signal is input from the first steering torque input I/F monitoring unit 18*a*.

An input terminal of the second microcomputer 1*b*6 is connected to the first rotation angle input I/F monitoring unit 21*a* in the first microcomputer 1*a*6, and the first rotation angle input I/F abnormality signal is input from the first rotation angle input I/F monitoring unit 21*a*.

An input terminal of the second microcomputer 1*b*6 is connected to the first switch control unit 4*a*6 in the first microcomputer 1*a*6, and the first switching signal is input from the first switch control unit 4*a*6.

An output terminal of the second microcomputer 1*b*6 is connected to the second switch control unit 4*b*6 and the first microcomputer 1*a*6, and outputs the second steering torque input I/F abnormality signal that is output from the second steering torque input I/F monitoring unit 18*b* to the second switch control unit 4*b*6 and the first microcomputer 1*a*6.

An output terminal of the of the second microcomputer 1*b*6 is connected to the second switch control unit 4*b*6 and the first microcomputer 1*a*6, and outputs the second rotation angle input I/F abnormality signal that is output from the second rotation angle input I/F monitoring unit 21*b* to the second switch control unit 4*b*6 and the first microcomputer 1*a*6.

The second steering torque input I/F monitoring unit 18*b* is a functional component that is provided within the second microcomputer 1*b*6. The second steering torque input I/F monitoring unit 18*b* includes one input terminal and one output terminal. The second steering torque input I/F monitoring unit 18*b* monitors an operation state of the second steering torque input I/F 17*b* based on the second torque conversion signal that is input from the second steering torque input I/F 17*b*. When the second steering torque input I/F monitoring unit 18*b* determines that an abnormality occurred at the second steering torque input I/F 17*b*, the second steering torque input I/F monitoring unit 18*b* outputs the second steering torque input I/F abnormality signal which shows the abnormality, to the second switch control unit 4*b*6 and the first microcomputer 1*a*6.

The second rotation angle input I/F monitoring unit 21*b* is a functional component that is provided within the second microcomputer 1*b*6. The second rotation angle input I/F monitoring unit 21*b* includes one input terminal and one output terminal. The second rotation angle input I/F monitoring unit 21*b* monitors an operation state of the second rotation angle input I/F 20*b* based on the second rotation conversion signal that is input from the second rotation angle input I/F 20*b*. When the second rotation angle input I/F monitoring unit 21*b* determines that an abnormality occurred at the second rotation angle input I/F 20*b*, the second rotation angle input I/F monitoring unit 21*b* outputs the second rotation angle input I/F abnormality signal which shows the abnormality, to the second switch control unit 4*b*6 and the first microcomputer 1*a*6.

Next, an operation of a motor control device 100 and an electric power steering device according to the seventh embodiment is explained.

The first microcomputer 1*a*6 generates the gate control signal S1 to S6 based on the first torque conversion signal that is input from the first steering torque input I/F 17*a*, the U phase conversion current signal, the V phase conversion current signal, and the W phase conversion current signal that are generated by the current input I/F 8, and the first rotation conversion signal that is input from the first rotation angle input I/F 20*a* in the main control unit F1.

In other words, the first microcomputer 1*a*6 in the main control unit F1 feedback controls the motor 6 based on the steering torque that is detected by the steering torque detection unit 16, a U phase drive current, a V phase drive current and a W phase drive current that are detected by the current detection unit 7, and a rotation angle detected by the rotation angle detection unit 19.

More specifically, the first microcomputer 1*a*6 calculates a target current from the first torque conversion signal, and obtains the U phase drive current, the V phase drive current, and the W phase drive current from the U phase conversion current signal, the V phase conversion current signal, and the W phase conversion current signal that are input from the current input I/F 8.

The first microcomputer 1*a*6 calculates a detected drive current value by using the first rotation conversion signal which shows the rotation angle of the motor 6, and the U phase drive current, the V phase drive current, and the W phase drive current that are transmitted through the motor 6. The first microcomputer 1*a*6 generates the gate control signal S1 to S6 so that a variance between the target current and the detected drive current value is "zero".

The second microcomputer 1*b*6 generates the gate control signal S1 to S6 based on the second torque conversion signal that is input from the second steering torque input I/F 17*b*, the U phase conversion current signal, the V phase conversion current signal, and the W phase conversion current signal that are input from the current input I/F 8, and the second rotation conversion signal that is input from the second rotation angle input I/F 20*b* when the auxiliary control unit F2 controls the motor 6, instead of the main control unit F1.

In other words, similar to the in first microcomputer 1*a*6 in the main control unit F1, the second microcomputer 1*b*6 in the auxiliary control unit F2 feedback controls the motor 6 based on the steering torque that is detected by the steering torque detection unit 16, the U phase drive current, the V phase drive current, and the W phase drive current that are detected by the current detection unit 7, and the rotation angle detected by the rotation angle detection unit 19.

More specifically, second microcomputer 1*b*6 calculates a target current from the second torque conversion signal, and obtains a U phase drive current, a V phase drive current, and a W phase drive current based on the U phase conversion current signal, the V phase conversion current signal, and the W phase conversion current signal that are input from the current input I/F 8.

The second microcomputer 1*b*6 calculates a detected drive current value by using the second rotation conversion signal which shows the rotation angle of the motor 6, and the U phase drive current, the V phase drive current, and the W phase drive current that are transmitted through the motor 6. The second microcomputer 1*b*6 generates the gate control signal S1 to S6 so that a variance between the target current and the detected drive current value is "zero".

The first switch control unit 4*a*6 in the main control unit F1 generates the first switching signal so that the first signal cut off switch 3*a* is set to a cut off state, when an abnormality occurs in at least one of the first steering torque input I/F 17*a* or the first rotation angle input I/F 20*a*. Along with the aforementioned, a signal that shows that the first signal cut off switch 3*a* is in a cut off state is input to the second microcomputer 1*b*6. With the aforementioned as a trigger, the second switch control unit 4*b*6 in the auxiliary control unit F2 outputs the second switching signal, which sets the second signal cut off switch 3*b* to a transmission state, to the first microcomputer 1*a*6 in the main control unit F1.

The second switch control unit 4*b*6 in the auxiliary control unit F2 generates the second switching signal so that the second signal cut off switch 3*b* is set to a cut off state, when an abnormality occurs in at least one of the second steering torque input I/F 17*b* or the second rotation angle input I/F 20*b*. Along with the aforementioned, a signal that shows that the second signal cut off switch 3*b* is in a cut off state is input to the first microcomputer 1*a*6. With the aforementioned as a trigger, the first switch control unit 4*a*6 in the main control unit F1 outputs the first switching signal, which sets the first signal cut off switch 3*a* to a transmission state, to the second microcomputer 1*b*6 in the auxiliary control unit F2.

In other words, the first microcomputer 1*a*6 in the main control unit F1 recognizes output states (output/no output) of the gate signals Sg1 to Sg6 from the auxiliary control unit F2 to the motor drive circuit 5. The second microcomputer 1*b*6 in the auxiliary control unit F2 recognizes output states (output/no output) of the gate signals Sg1 to Sg6 from the main control unit F1 to the motor drive circuit 5.

As such, according to the seventh embodiment, the motor 6 is feedback controlled based on the steering torque, the U phase drive current, the V phase drive current, and the W phase drive current, as well as the rotation angle of the motor 6. As such, it is possible to control the motor 6 with high accuracy. Therefore, according to the seventh embodiment, it is possible to properly realize a more appropriate assist to a steering torque that affects steering of an automobile operator.

The electric power steering device according to the seventh embodiment further includes the steering torque detection unit 16 which detects the steering torque of steering of the automobile operator, the first steering torque input I/F 17*a* that converts the detected torque signal detected by the steering torque detection unit 16 to the first torque conversion signal, and inputs the first torque conversion signal to the first control signal generator, the first steering torque input I/F monitoring unit 18*a* that determines the presence or absence of an abnormality occurrence in the first steering torque input I/F 17*a*, the second steering torque input I/F 17*b* that converts the detected torque signal that is detected by the steering torque detection unit 16 to the second torque conversion signal, and inputs the second torque conversion signal to the second control signal generator, and the second steering torque input I/F monitoring unit 18*b* that determines the presence or absence of an abnormality occurrence in the second steering torque input I/F 17*b*. The first switcher 100*b* cuts off output of the drive signal based on the first control signal to the motor drive circuit 5, when the first steering torque input I/F monitoring unit 18*a* determines that an abnormality occurred in the first steering torque input I/F 17*a*. The second switcher 100*c* cuts off output of the drive signal based on the second control signal to the motor drive circuit 5, when the second steering torque input I/F monitoring unit 18*b* determines that an abnormality occurred in the second steering torque input I/F 17*b*.

The electric power steering device according to the seventh embodiment further includes the rotation angle detection unit 19 that detects the rotation angle of the motor 6, the first rotation angle input I/F 20*a* that converts the detected rotation angle signal detected by the rotation angle detection unit 19 to the first rotation conversion signal, and inputs the first rotation conversion signal to the first control signal generator, the first rotation angle input I/F monitoring unit 21*a* that determines the presence or absence of an abnormality occurrence in the first rotation angle input I/F 20*a*, the second rotation angle input I/F 20*b* that converts the detected rotation angle signal that is detected by the rotation angle detection unit 19 to the second rotation conversion signal, and inputs the second rotation conversion signal to the second control signal generator, and the second rotation angle input I/F monitoring unit 21*b* that determines the presence or absence of an abnormality occurrence in the second rotation angle input I/F 20*b*. The first switcher 100*b* cuts off output of the drive signal based on the first control signal to the motor drive circuit 5, when the first rotation angle input I/F monitoring unit 21*a* determines that an abnormality occurred in the first rotation angle input I/F 20*a*. The second switcher 100*c* cuts off output of the drive signal based on the second control signal to the motor drive circuit 5, when the second rotation angle input I/F monitoring unit 21*b* determines that an abnormality occurred in the second rotation angle input I/F 20*b*.

In the present embodiment, the first signal cut off switch 3*a* is controlled based on an abnormality occurrence at the first steering torque input I/F 17*a* or the first rotation angle input I/F 20*a*, and the second signal cut off switch 3*b* is controlled based on an abnormality occurrence at the second steering torque input I/F 17*b* or the second rotation angle input I/F 20*b*. Since the first microcomputer 1*a*6 in the main control unit F1 recognizes the output state (output/no output) of the gate signals Sg1 to Sg6 in the auxiliary control unit F2, and the second microcomputer 1*b*6 in the auxiliary control unit F2 recognizes the output state (output/no output) of the gate signals Sg1 to Sg6 in the main control unit F1, it is possible to further increase stability against abnormality occurrences.

The technical scope of the present embodiment is not limited to the previously mentioned embodiments, and various changes that do not depart from the technical scope are possible.

For example, the motor control device 100 may be used to control a motor other than the motor of the electric power steering device.

The first control signal generator and the second control signal generator need not be microcomputers. For example, the first control signal generator and the second control signal generator may be a configuration where each has a storage unit, a processor or the like that are mounted on a circuit board as a separate entities.

The first drive signal processor and the second drive signal processor do not need an IC as a pre-driver, and may be a configuration that consists of a plurality of components that are mounted on a circuit board.

The drive current detector 100*a* may be realized in a configuration other than a configuration of the current detection unit 7 and the current input I/F 8.

The first switcher 100*b* may be realized in a configuration other than a configuration of the first signal cut off switch 3*a* and the first switch control unit 4*a*. Similarly the second switcher 100*c* may be realized in a configuration other than a configuration of the second signal cut off switch 3*b* and the second switch control unit 4*b*.

The motor 6 need not be a three phase direct current electric motor.

The previously mentioned embodiments and/or examples may be appropriately combined.

REFERENCE SIGN LIST

1*a*, 1*a*2, 1*a*3, 1*a*4, 1*a*6 . . . First Microcomputer, 1*b*, 1*b*2, 1*b*3, 1*b*4, 1*b*5, 1*b*6 . . . Second Microcomputer, 2*a*, 2*a*3 . . . First Pre-Driver, 2*b*, 2*b*3 . . . Second Pre-Driver, 5 . . . Motor Drive, 6 . . . Motor, 11*a* . . . First Power Supply, 11*b* . . . Second Power Supply, 12*a* . . . First Power Supply Monitoring Unit, 12*b* . . . Second Power Supply Monitoring Unit, 13*a* . . . First Pre-Driver Monitoring Unit, 13*b* . . . Second Pre-Driver Monitoring Unit, 14*a* . . . First Current Input I/F Monitoring Unit, 14*b* . . . Second Current Input I/F Monitoring Unit, 15 . . . Motor Terminal Condition Detection, 16 . . . Steering Torque Detection, 17*a* . . . First Steering Torque Input I/F, 17*b* . . . Second Steering Torque Input I/F, 18*a* . . . First Steering Torque Input I/F Monitoring Unit, 18*b* . . . second steering torque input I/F monitoring unit, 19 . . . Rotation Angle Detection, 20*a* . . . First Rotation Angle Input I/F, 20*b* . . . Second Rotation Angle Input I/F, 21*a* . . . First Rotation Angle Input I/F Monitoring Unit, 21*b* . . . Second Rotation Angle Input I/F Monitoring Unit, 100 . . . Motor Control, 100*a* . . . Drive Current Detector, 100*b* . . . First Switcher, 100*c* . . . Second Switcher, A1~D1,F1 . . . Main Control, A2~F2 . . . Auxiliary Control

The invention claimed is:

1. A motor control device comprising:

a motor drive circuit that outputs a drive current to a motor;

a drive current detector that detects the drive current;

a main control unit, and an auxiliary control unit, wherein the motor drive circuit:

is driven based on a drive signal that is output from the main control unit or the auxiliary control unit, and includes a plurality of switching elements, and the motor is driven by having each of the switching elements switch between supply and cut off of the drive current to the motor, the main control unit has:

a first control signal generator that generates a first control signal based on a detected current signal that is input from the drive current detector;

a first drive signal generator that generates the drive signal based on the first control signal, and a first switcher that switches an output state of the drive signal to the motor drive circuit, the auxiliary control unit has:

a second control signal generator that generates a second control signal based on a detected current signal that is input from the drive current detector;

a second drive signal generator that generates the drive signal based on the second control signal, and a second switcher that switches an output state of the drive signal to the motor drive circuit, the motor control device has:

a first control signal generator monitoring unit that monitors an operation state of the first control signal generator, and outputs a first abnormality signal to the first switcher and the second control signal generator when the first control signal generator monitoring unit determines that an abnormality is occurring in the first control signal generator, and a second control signal generator monitoring unit that monitors an operation state of the second control signal generator, and outputs a second abnormality signal to the second switcher and the first control signal generator when the second control signal generator monitoring unit determines that an abnormality is occurring in the second control signal generator, wherein the drive signal is output to the motor drive circuit from a control unit having no abnormality out of the main control unit and the auxiliary control unit, and a first drive signal generator monitoring unit that monitors an operation state of the first drive signal generator, and outputs a first drive abnormality signal to the first switcher and the second control signal generator when the first drive signal generator monitoring unit determines that an abnormality is occurring in the first drive signal generator, and a second drive signal generator monitoring unit that monitors an operation state of the second drive signal generator, and outputs a second drive abnormality signal to the second switcher and the first control signal generator when the second drive signal generator monitoring unit determines that an abnormality is occurring in the second drive signal generator, wherein the drive signal is output to the motor drive circuit from a control unit having no abnormality out of the main control unit and the auxiliary control unit.

2. The motor control device according to claim 1 further comprising:

a first power supply that supplies operation power to the first control signal generator and the first drive signal generator;

a second power supply that supplies operation power to the second control signal generator and the second drive signal generator;

a first power supply monitoring unit that monitors an operation state of the first power supply, and outputs a first power supply abnormality signal to the first switcher and the second control signal generator when the first power supply monitoring unit determines that an abnormality is occurring in the first power supply, and a second power supply monitoring unit that monitors an operation state of the second power supply, and outputs a second power supply abnormality signal to the second switcher and the first control signal generator when the second power supply monitoring unit determines that an abnormality is occurring in the second power supply, wherein the drive signal is output to the motor drive circuit from a control unit having no abnormality out of the main control unit and the auxiliary control unit.

3. The motor control device according to claim 1 further comprising:

a first detector monitoring unit that is provided in the main control unit, that monitors an operation state of the drive current detector, and that outputs a first current detection abnormality signal to the first switcher and the second control signal generator when the first detector monitoring unit determines that an abnormality is occurring in the drive current detector, and a second detector monitoring unit that is provided in the auxiliary control unit, that monitors an operation state of the drive current detector, and that outputs a second current detection abnormality signal to the second switcher and the first control signal generator when the second detector monitoring unit determines that an abnormality is occurring in the drive current detector.

4. The motor control device according to claim 1, wherein:

the main control unit outputs the drive signal to the motor drive circuit via the first switcher only when the second switcher does not output the drive signal to the motor drive circuit, and the auxiliary control unit outputs the drive signal to the motor drive circuit via the second switcher only when the first switcher does not output the drive signal to the motor drive circuit.

5. The motor control device according to claim 1 further comprising:

a motor terminal state detection unit that detects a state of an input terminal of the motor as a motor terminal state, wherein the second control signal generator determines failure of the auxiliary control unit by referencing the motor terminal state.

6. The motor control device according to claim 1, wherein the second control signal generator has a lower computing power than the first control signal generator.

7. An electric power steering device comprising:

the motor control device according to claim 1;

the motor which generates an assist torque to assist a steering torque of steering of an operator.

8. The electric power steering device according to claim 7 further comprising:

a steering torque detection unit which detects the steering torque;

a first steering torque input I/F that converts a detected torque signal that is detected by the steering torque detection unit to a first torque conversion signal, and inputs the first torque conversion signal to the first control signal generator;

a first steering torque input I/F monitoring unit that determines the presence or absence of an abnormality occurrence in the first steering torque input I/F;

a second steering torque input I/F that converts the detected torque signal that is detected by the steering torque detection unit to a second torque conversion signal, and inputs the second torque conversion signal to the second control signal generator, and a second steering torque input I/F monitoring unit that determines the presence or absence of an abnormality occurrence in the second steering torque input I/F, wherein the first switcher cuts off output of the drive signal based on the first control signal to the motor drive circuit, when the first steering torque input I/F monitoring unit determines that an abnormality occurred in the first steering torque input I/F, and the second switcher cuts off output of the drive signal based on the second control signal to the motor drive circuit, when the second steering torque input I/F monitoring unit determines that an abnormality occurred in the second steering torque input I/F.

9. The electric power steering device according to claim 7 further comprising:

a rotation angle detection unit that detects the rotation angle of the motor;

a first rotation angle input I/F that converts a detected rotation angle signal detected by the rotation angle detection unit to a first rotation conversion signal, and inputs the first rotation conversion signal to the first control signal generator;

a first rotation angle input I/F monitoring unit that determines the presence or absence of an abnormality occurrence in the first rotation angle input I/F;

a second rotation angle input I/F that converts the detected rotation angle signal that is detected by the rotation angle detection unit to a second rotation conversion signal, and inputs the second rotation conversion signal to the second control signal generator, and a second rotation angle input I/F monitoring unit that determines the presence or absence of an abnormality occurrence in the second rotation angle input I/F, wherein the first switcher cuts off output of the drive signal based on the first control signal to the motor drive circuit, when the first rotation angle input I/F monitoring unit determines that an abnormality occurred in the first rotation angle input I/F, and the second switcher cuts off output of the drive signal based on the second control signal to the motor drive circuit, when the second rotation angle input I/F monitoring unit determines that an abnormality occurred in the second rotation angle input I/F.

* * * * *